April 2, 1935.   L. BENOIT ET AL   1,996,188
EGG CARTON FILLER MACHINE
Filed July 21, 1933    14 Sheets-Sheet 2

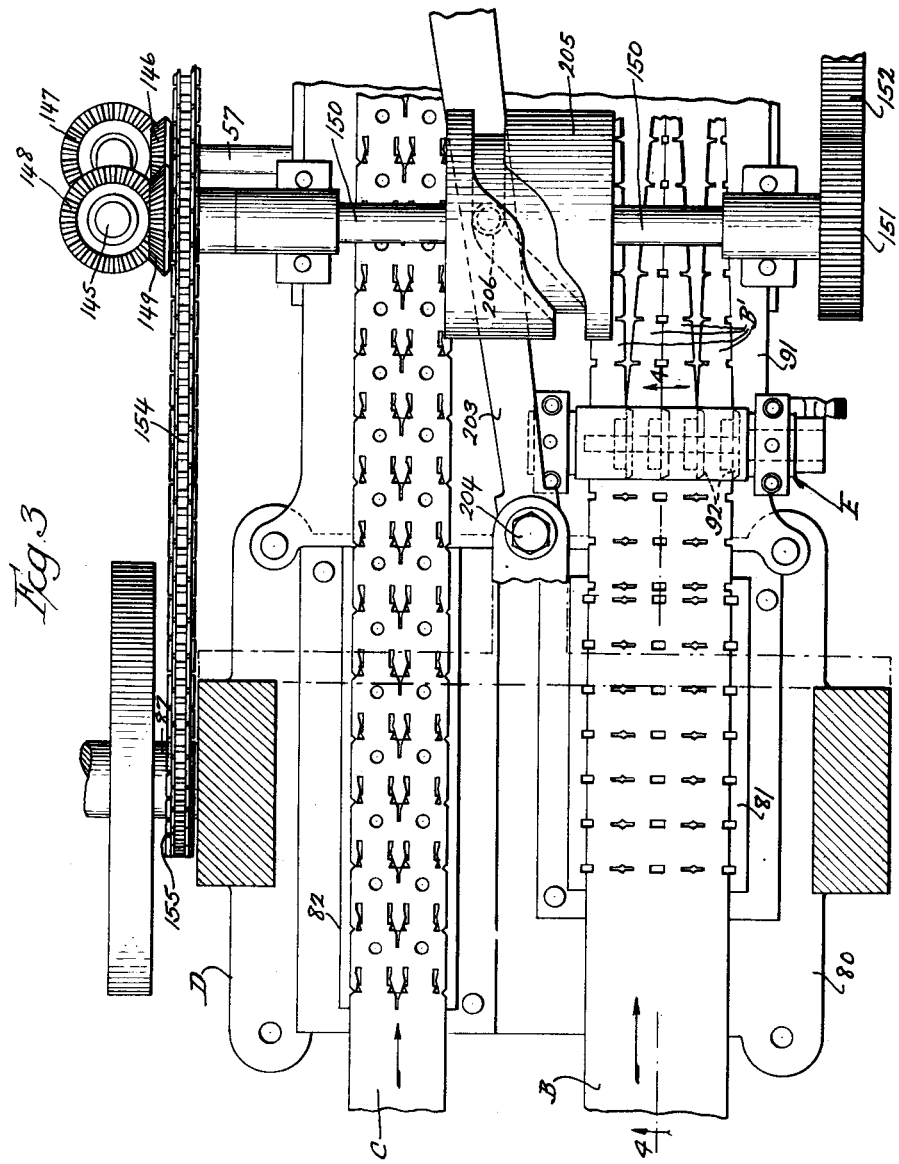

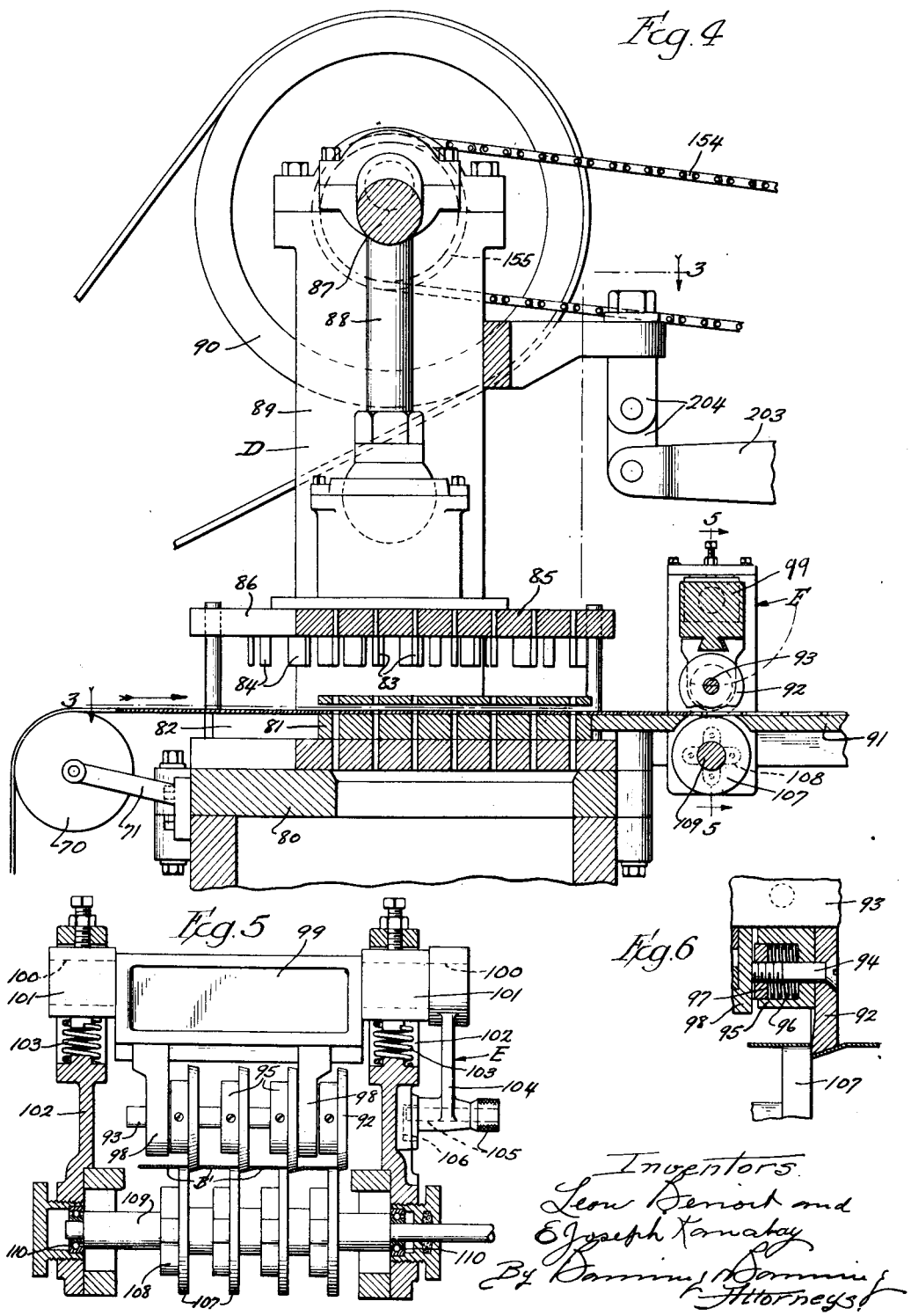

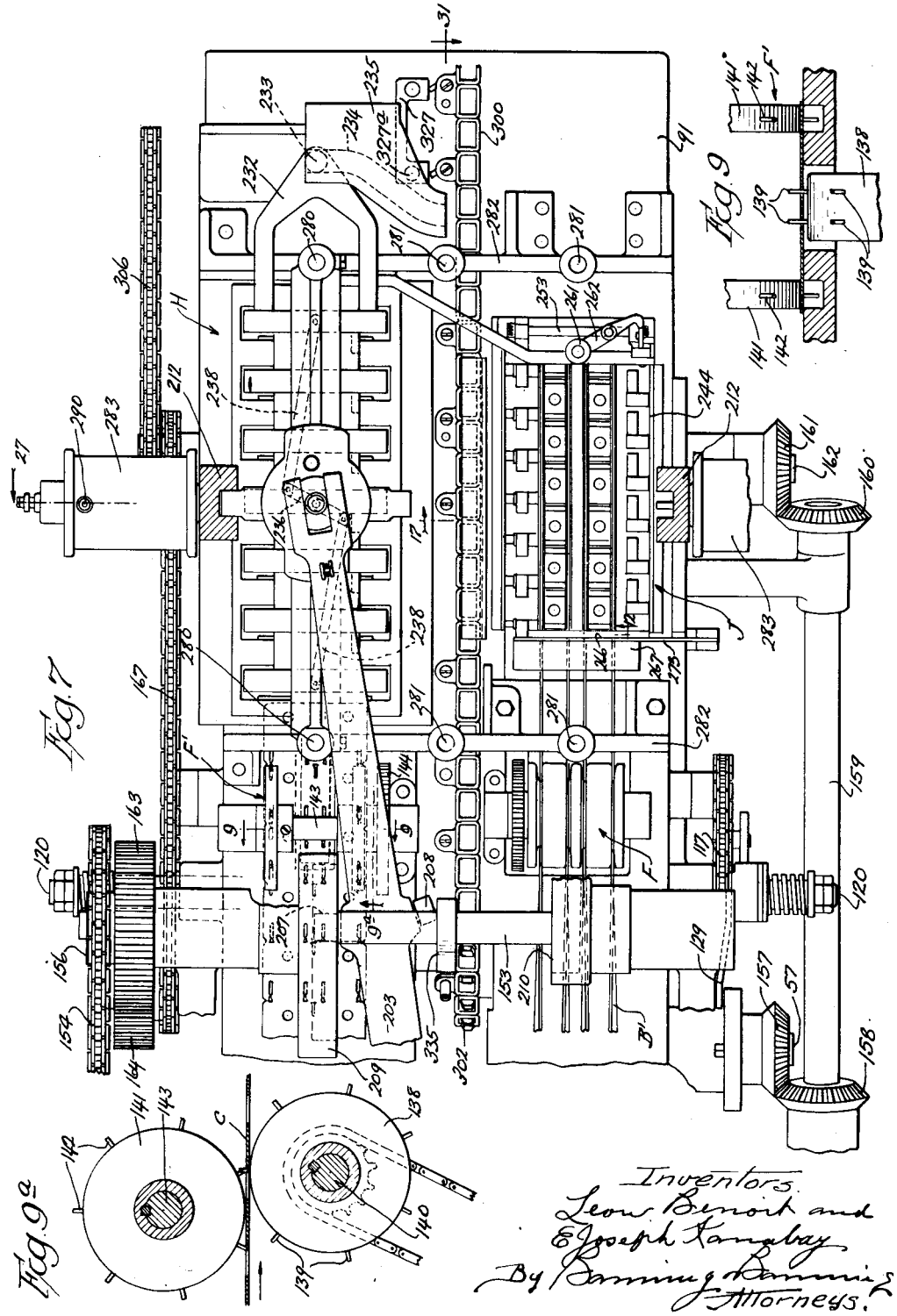

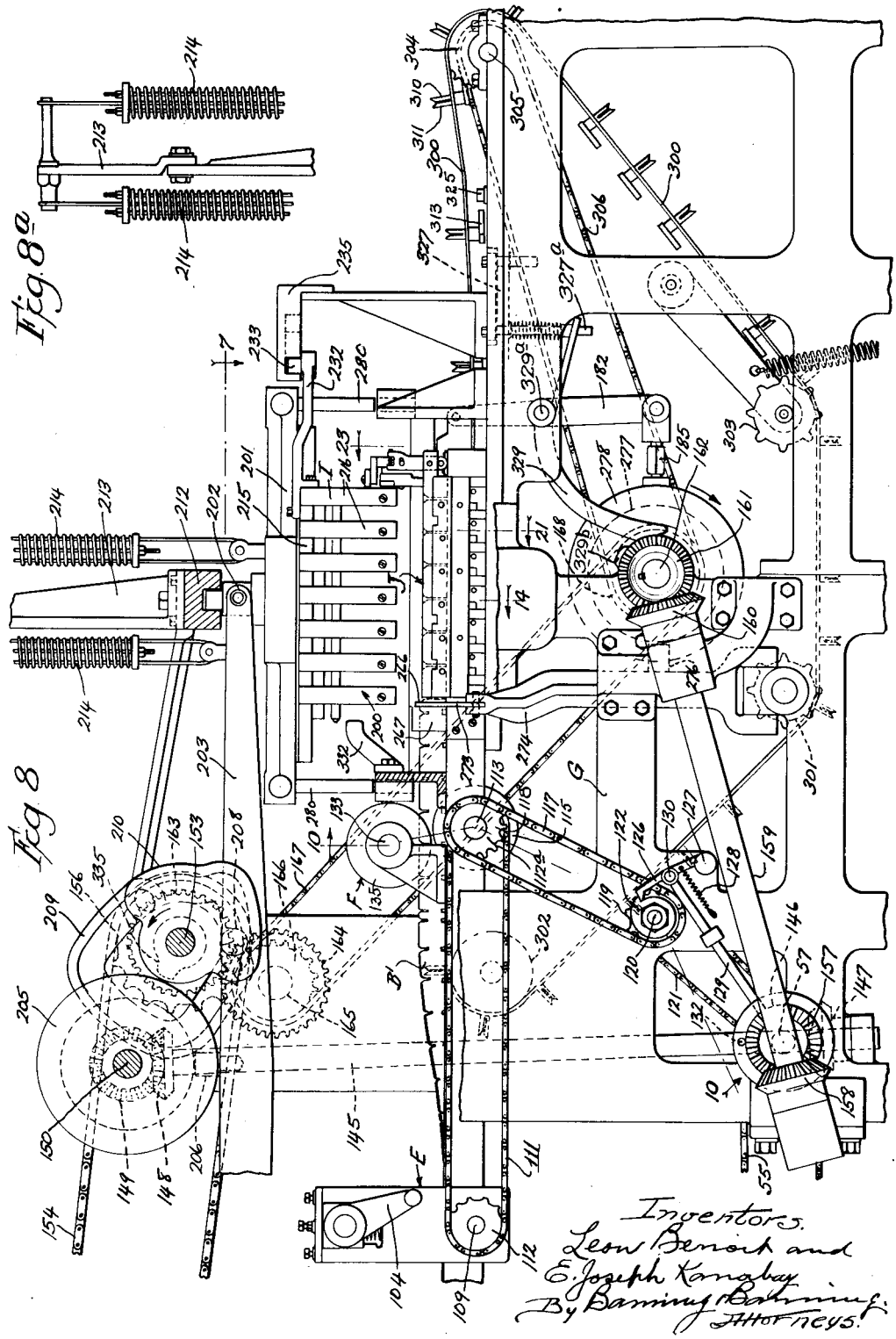

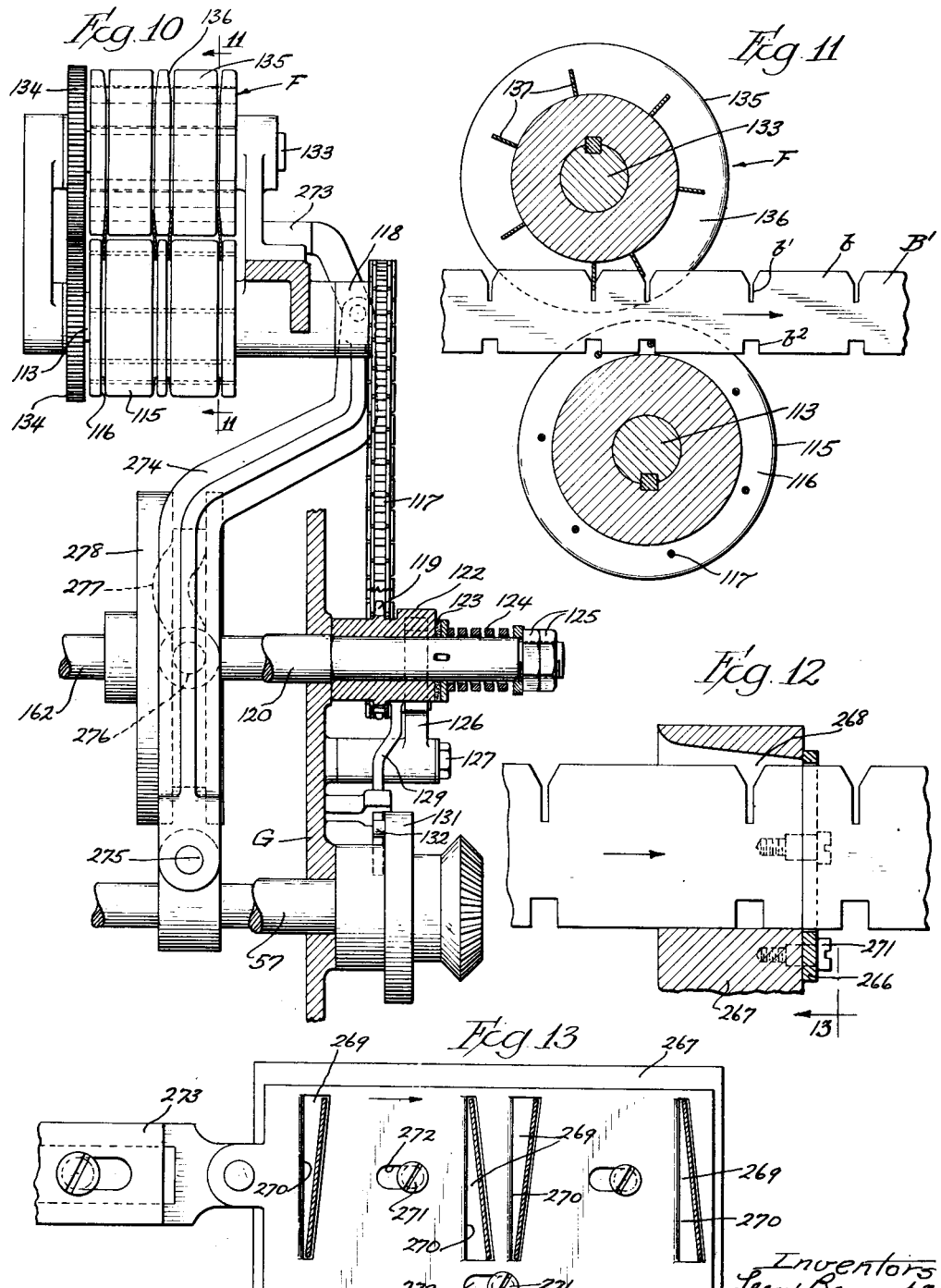

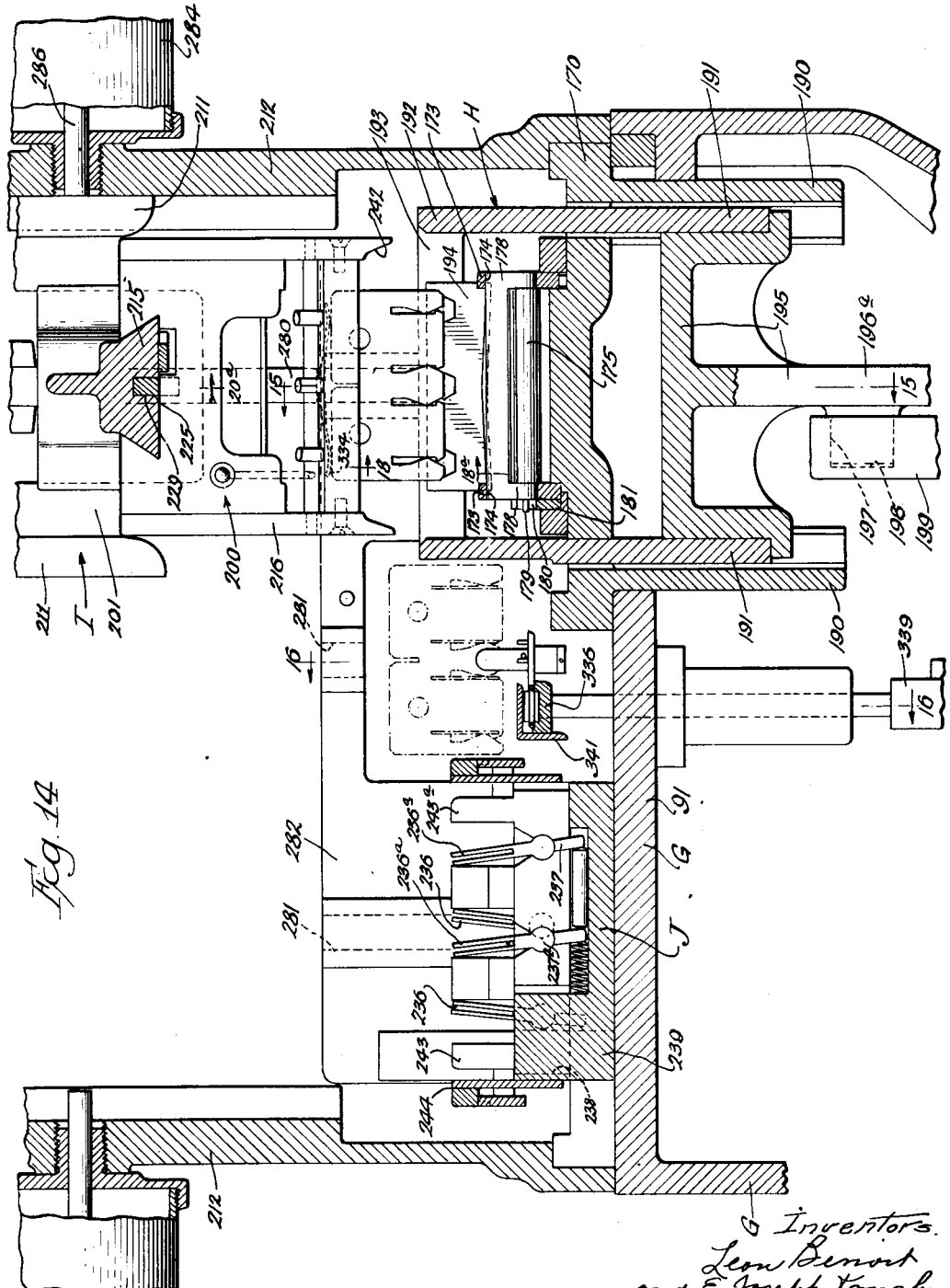

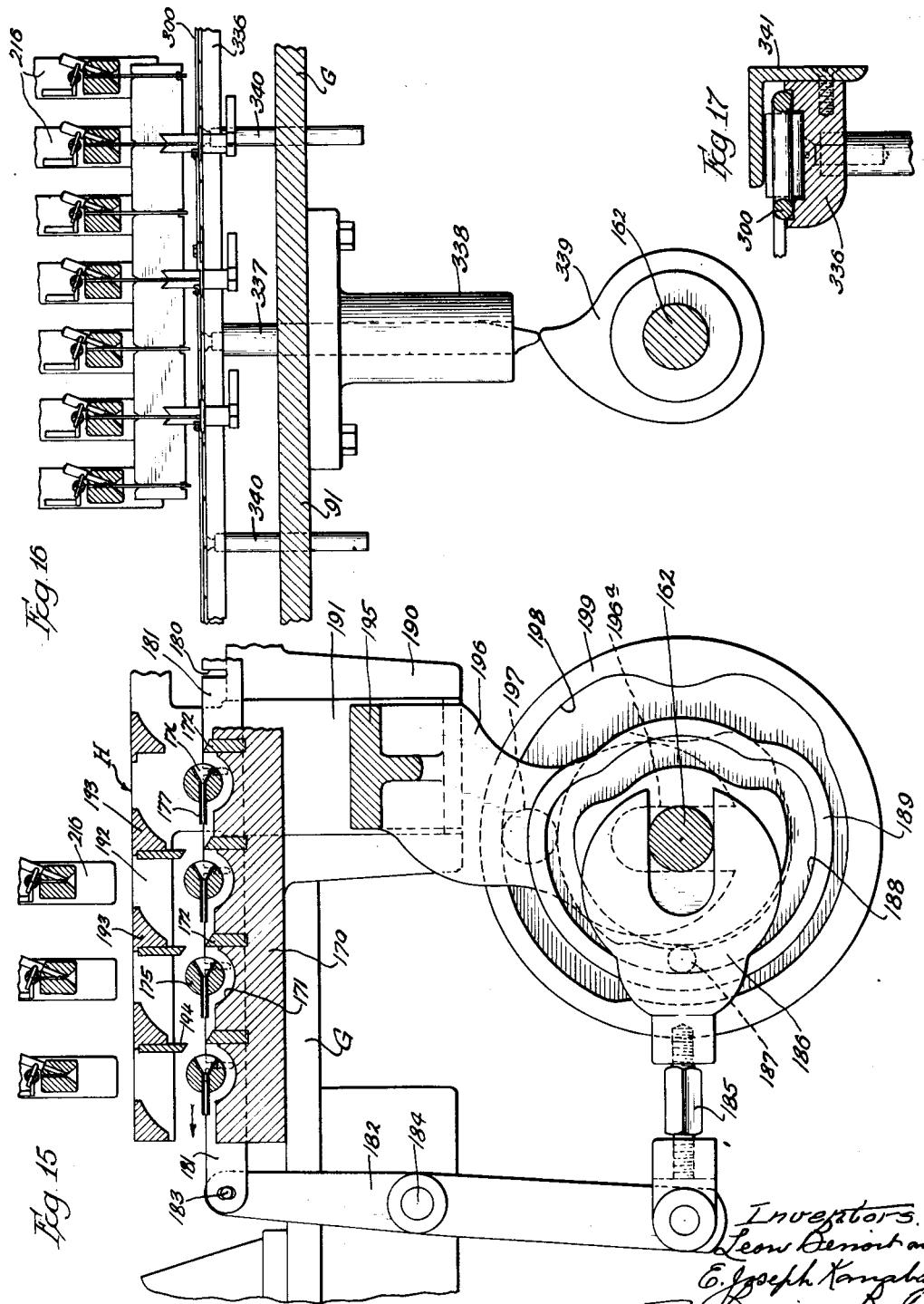

April 2, 1935. L. BENOIT ET AL 1,996,188
EGG CARTON FILLER MACHINE
Filed July 21, 1933 14 Sheets-Sheet 10
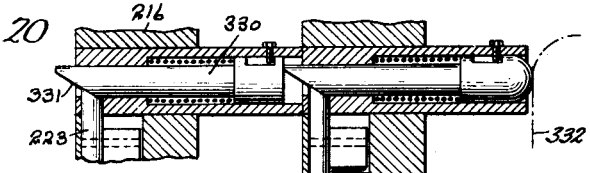
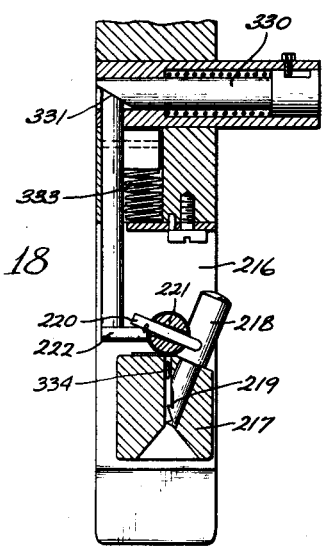
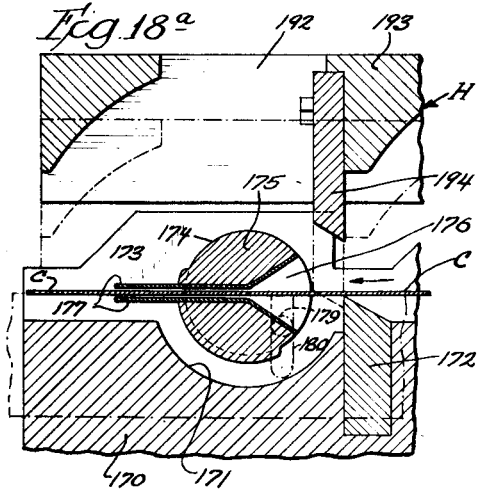
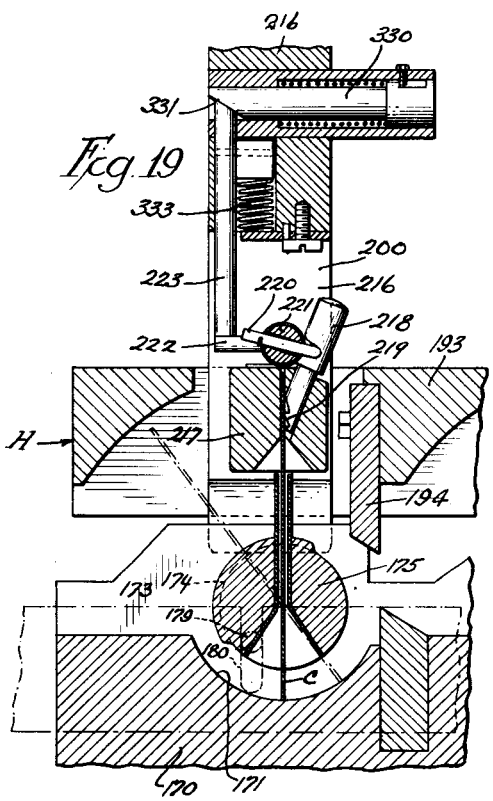

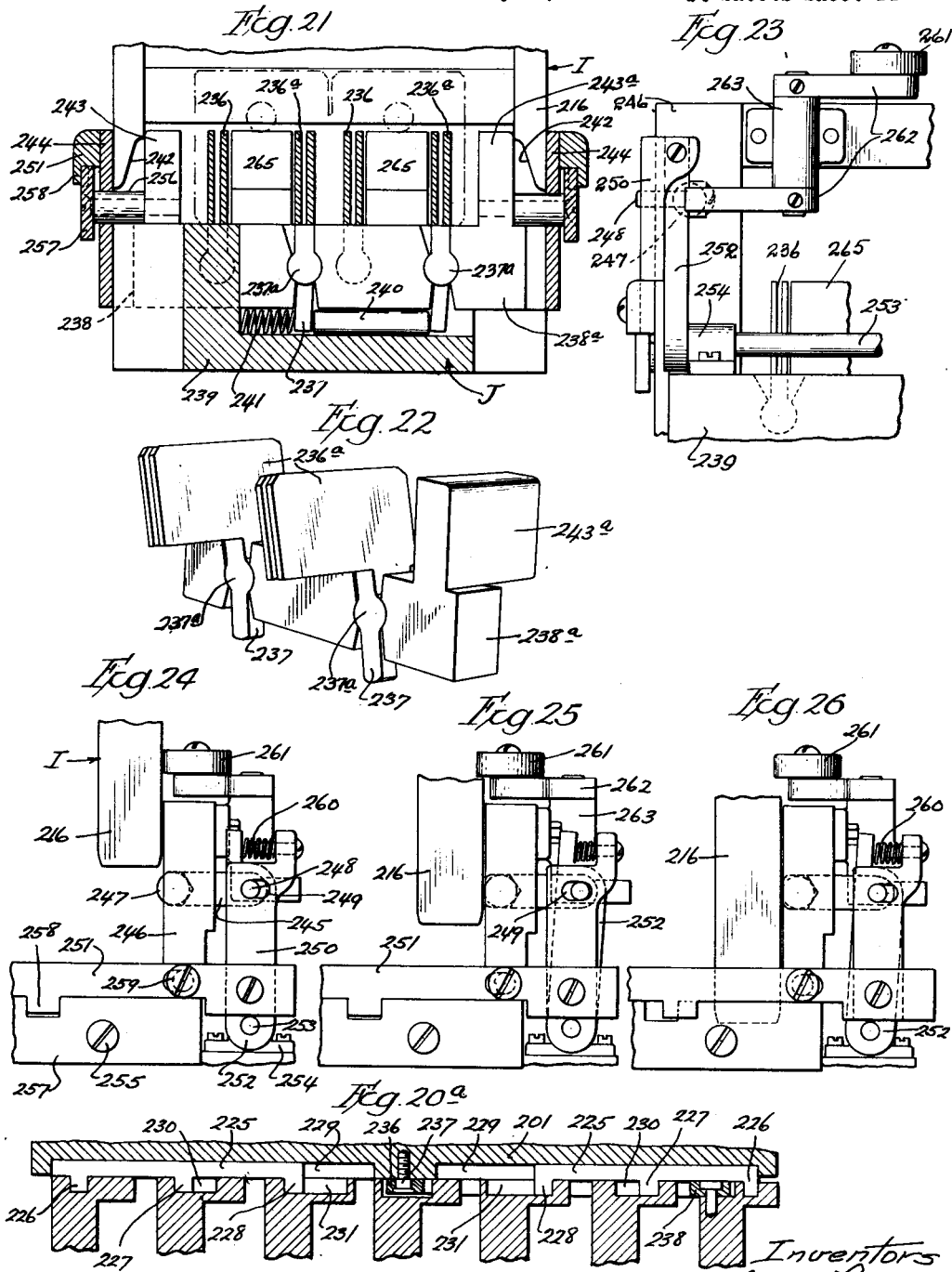

April 2, 1935. L. BENOIT ET AL 1,996,188
EGG CARTON FILLER MACHINE
Filed July 21, 1933  14 Sheets-Sheet 12
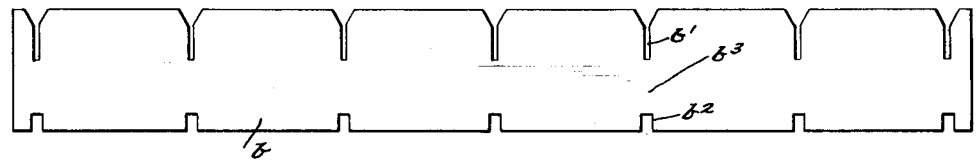
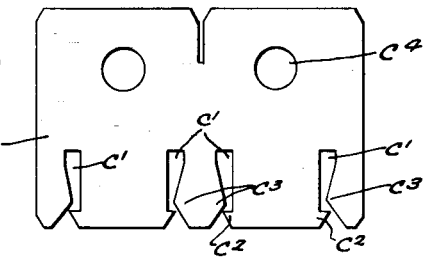
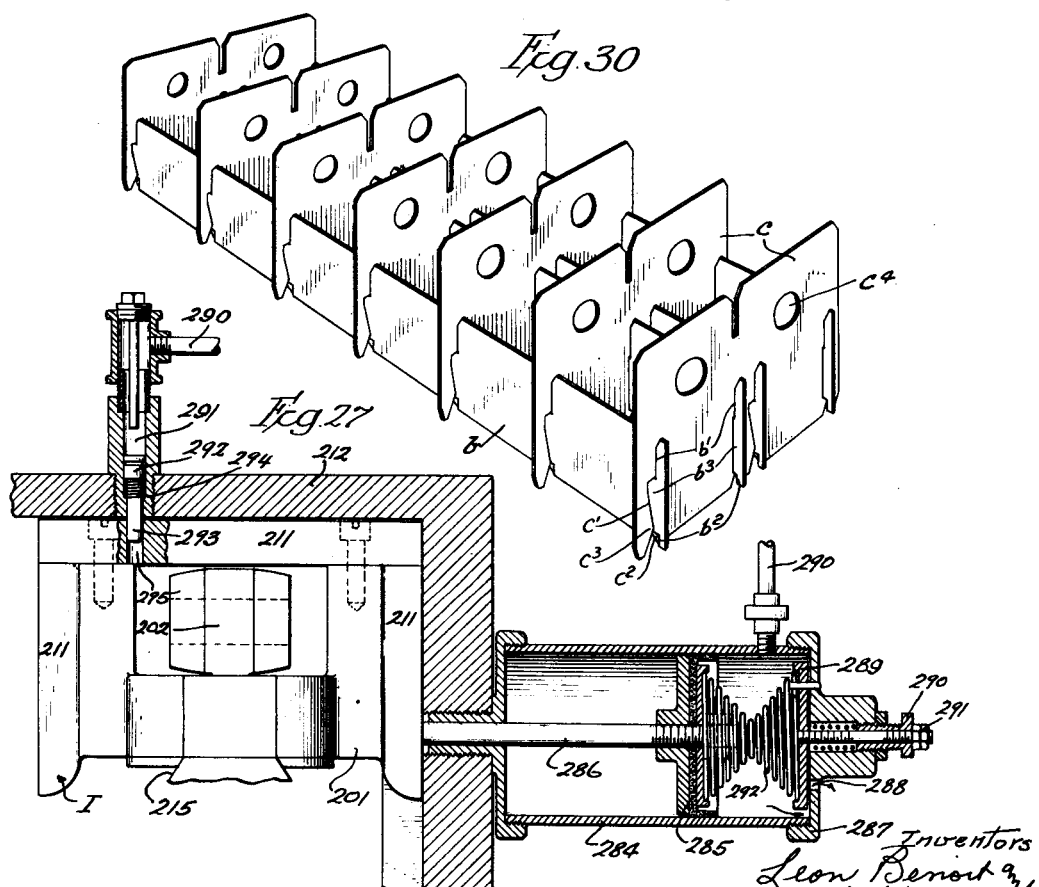

April 2, 1935.  L. BENOIT ET AL  1,996,188
EGG CARTON FILLER MACHINE
Filed July 21, 1933    14 Sheets-Sheet 13
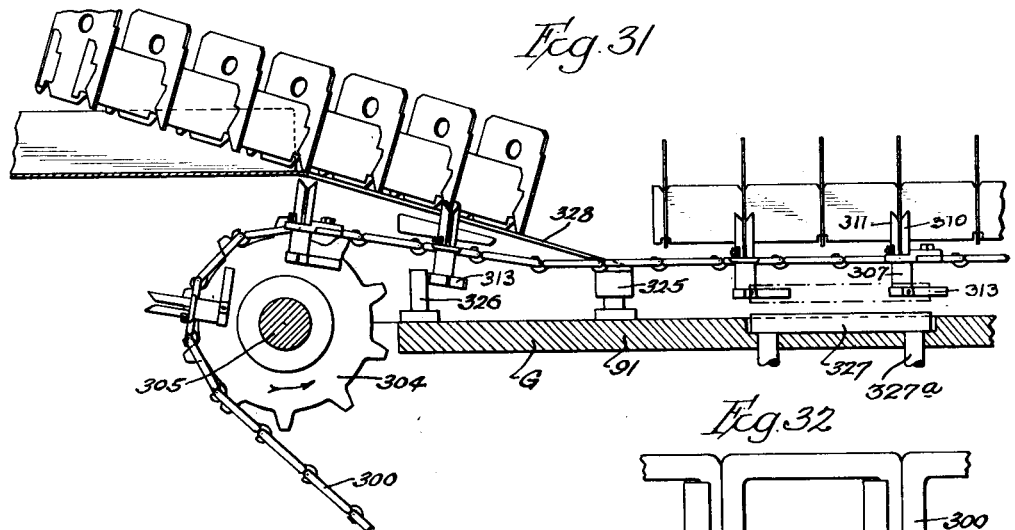
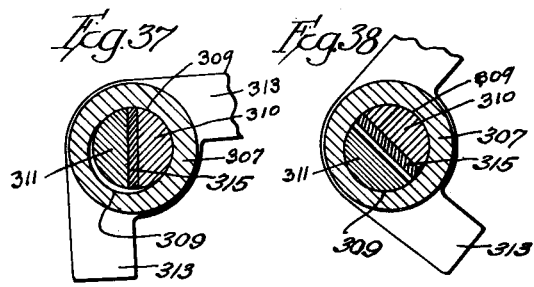
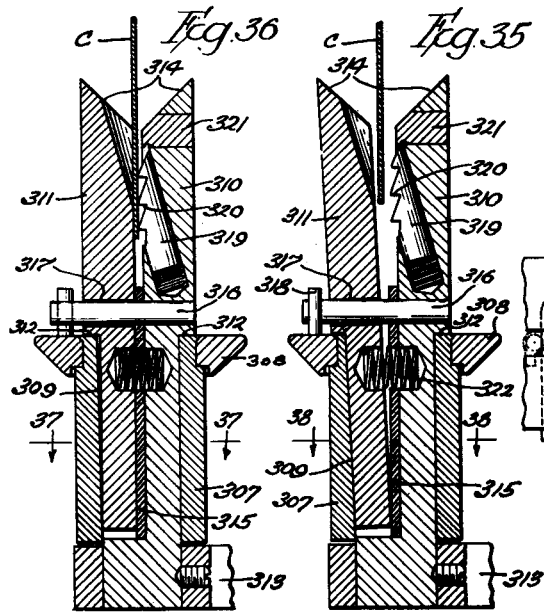
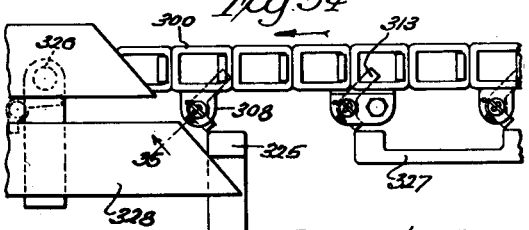
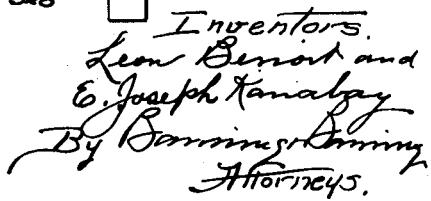

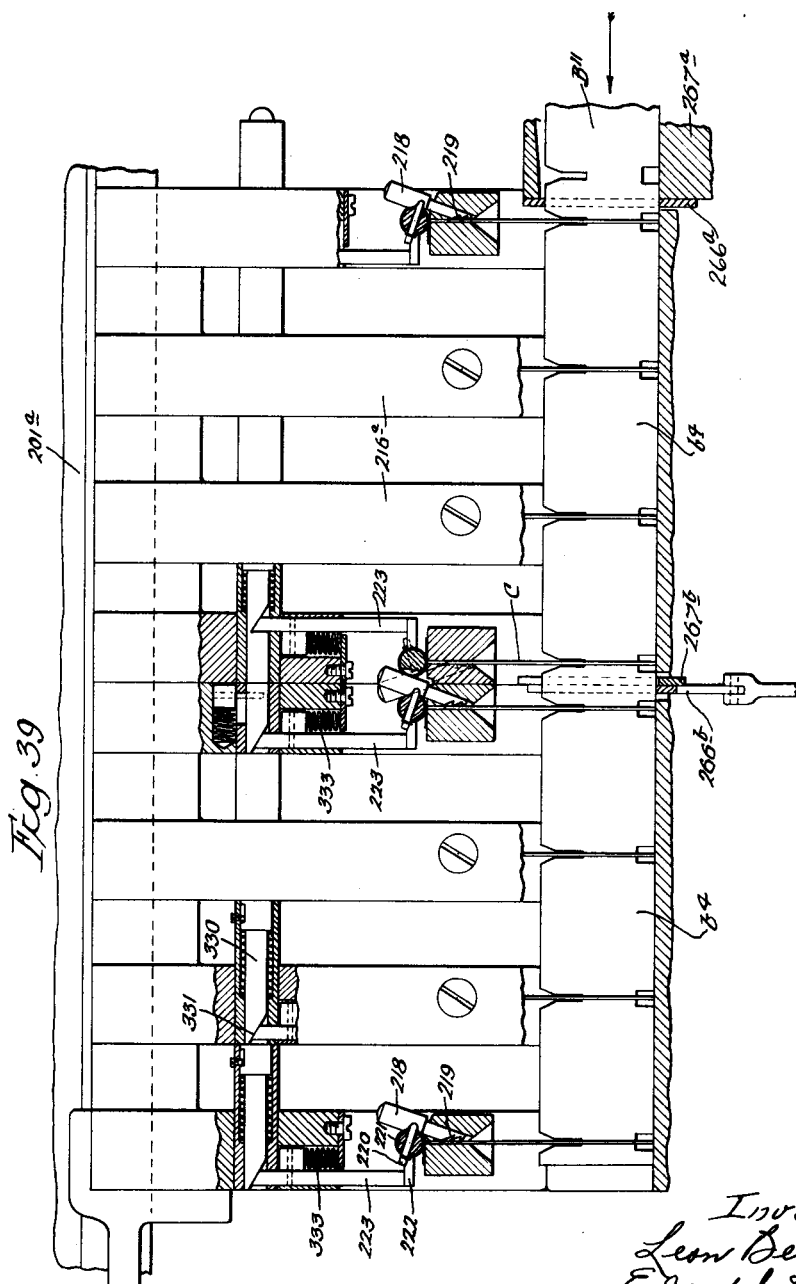

Patented Apr. 2, 1935

1,996,188

UNITED STATES PATENT OFFICE 1,996,188

EGG CARTON FILLER MACHINE

Leon Benoit, New York, and Edward Joseph Kanabay, Nyack, N. Y.; said Kanabay assignor to said Benoit Application July 21, 1933, Serial No. 681,530
In Great Britain July 28, 1932

13 Claims. (Cl. 93—37)

This invention, which relates to egg carton filler machines, is particularly adapted for operating on long sheets of filler material, such as cardboard, strawboard, or the like, to form therefrom notched strips that are assembled by the machine to form a carton filler having spaced cells formed by the interlocking strips or walls.

A filler made by this machine comprises longitudinal walls which are intersected by cross walls, each set of walls being formed from different sheets of cardboard. The machine consists in a carton filler machine embodying a sheet delivering mechanism, sheet feeding mechanism, sheet notching mechanism, sheet cutting mechanism, and assembling mechanism for assembling the notched strips into a carton filler having interlocked walls. The machine further consists in a carton filler machine having mechanism whereby both of the long sheets are dispensed in parallel relation for the major part of their travel through the machine, one of the sheets being cut transversely of the sheet into cross walls, together with means for turning each cross wall at right angles to the sheet, and the other sheet being slit lengthwise into separate strips which are turned so as to stand at right angles to the sheet, and other means for carrying the cross walls, after they are upended, to a position where the notches thereof are aligned with the notches in the longitudinal walls, whereupon the several walls are interlocked to complete the filler, and finally removing the filler from the assembling mechanism and placing it on a conveyor chain by which it is carried away usually to suitable stacking means (not shown).

As a suggestive embodiment of this invention, reference is made to the accompanying drawings, in which—

Fig. 3 is a sectional plan of the punching and slitting mechanism with certain portions broken away, the section being taken on line 3—3 of Fig. 4;

Fig. 4 is a sectional elevational view of the mechanism shown in Fig. 3, the section being taken on line 4—4 of Fig. 3;

Fig. 5 is a sectional view of the slitting mechanism taken on line 5—5 of Fig. 4;

Fig. 6 is an enlarged fragmentary sectional view showing the details of one of the slitting knives taken on the same line 5—5 of Fig. 4;

Fig. 7 is a plan partly in section of the strip and sheet feeding mechanism, and the assembling device with certain portions broken away, the section being taken on the line 7 of Fig. 8;

Fig. 8 is a broken side elevation of the mechanism shown in Fig. 7;

Fig. 8a is a fragmentary view of a continuation in part of Fig. 8;

Fig. 9 is an enlarged fragmentary sectional view of the strip feeding mechanism, the section being taken on line 9—9 of Fig. 7;

Fig. 9a is a detail view partly in side elevation and partly in vertical horizontal section, taken on line 9a of Fig. 7;

Fig. 10 is an enlarged fragmentary view partly in end elevation and partly in cross section taken on the line 10—10 of Fig. 8;

Fig. 11 is a sectional view taken on the line 11—11 of Fig. 10;

Fig. 12 is an enlarged fragmentary sectional view of the severing mechanism for the longitudinal strips, the section being taken on the line 12 of Fig. 7;

Fig. 13 is an elevational view of the severing mechanism viewed from the line 13 of Fig. 12;

Fig. 14 is a sectional view of the assembling mechanism taken on line 14 of Fig. 8;

Fig. 15 is a sectional elevational view through the cross wall upending mechanism, the section being taken on the line 15—15 of Fig. 14;

Fig. 16 is a sectional elevational view through the chain conveyor, the section being taken on the line 16—16 of Fig. 14;

Fig. 17 is an enlarged sectional view through the chain lifting platform, the section being taken on the line 17 of Fig. 7;

Fig. 18 is an enlarged view in sectional elevation of the cross wall carrying mechanism taken on the line 18 of Fig. 14;

Fig. 18a is a similar sectional elevation of the cross wall cutting and upending mechanism, the knife being shown in cutting position, as indicated by broken lines, another section being taken on the line 18a of Fig. 14;

Fig. 19 is a sectional view of one of the carriers lowered to a position in the upending mechanism and engaging a cross wall therein;

Fig. 20 is a fragmentary sectional view of two of the carriers moved adjacent each other, the unlatching pins being moved longitudinally to unlatch the cross walls;

Fig. 20a is a vertical sectional view of the carriers and a portion of the head, the section being taken on the line 20a of Fig. 14;

Fig. 21 is a detail sectional view through the assembling mechanism showing the rocking strip guides in vertical position, the section being taken on line 21 of Fig. 8;

Fig. 22 is a perspective view of the strip guides seen in Fig. 21;

Fig. 23 is a detail fragmentary view in elevation of the locking mechanism for the strip guides, the same being viewed from line 23 of Fig. 8;

Fig. 24 is a fragmentary side elevation of the mechanism seen in Fig. 23, the parts being in unlocked position;

Fig. 25 is a view similar to Fig. 24 showing one of the carriers moved to a position to compress the locking spring;

Fig. 26 is a view similar to Fig. 25 showing the carrier moved to a still further down position whereby the locking bar is moved longitudinally to lock the strip guides in vertical position;

Fig. 27 is a detail sectional view of the dash pot mechanism, the section being taken on the line 27 of Fig. 7;

Fig. 28 is a detail side elevation of one of the notched strips which comprise the longitudinal walls of an egg carton filler constructed by the machine;

Fig. 29 is a detail side elevation of one of the notched cards which form the cross walls that interlock with strips of the kind shown in Fig. 28 to complete the carton filler;

Fig. 30 is a perspective view of a completed carton filler constructed by the machine;

Fig. 31 is a detail sectional view of the chain conveyor, the section being taken on the line 31 of Fig. 7;

Fig. 32 is an enlarged plan of a portion of the conveyor chain having a filler gripper mounted thereon;

Fig. 33 is a side elevation of the same;

Fig. 34 is a plan view on a reduced scale of the conveyor chain and elevated platform which strips the carton fillers from the filler grippers;

Fig. 35 is a greatly enlarged sectional view in detail of the gripper in open position as indicated, the section being taken on line 35 of Fig. 34;

Fig. 36 is a view similar to Fig. 35 showing the gripper closed, the section being taken on the line 36 of Fig. 32;

Fig. 37 is a transverse section of the gripper, taken on the line 37—37 of Fig. 36;

Fig. 38 is a view similar to Fig. 37 but taken on the line 38—38 of Fig. 35; and Fig. 39 is a view in sectional elevation showing a modified form of transferring and assembling mechanism whereby two carton fillers, each having one-half the number of cells, as shown in Fig. 30, are formed simultaneously.

Figure 1:
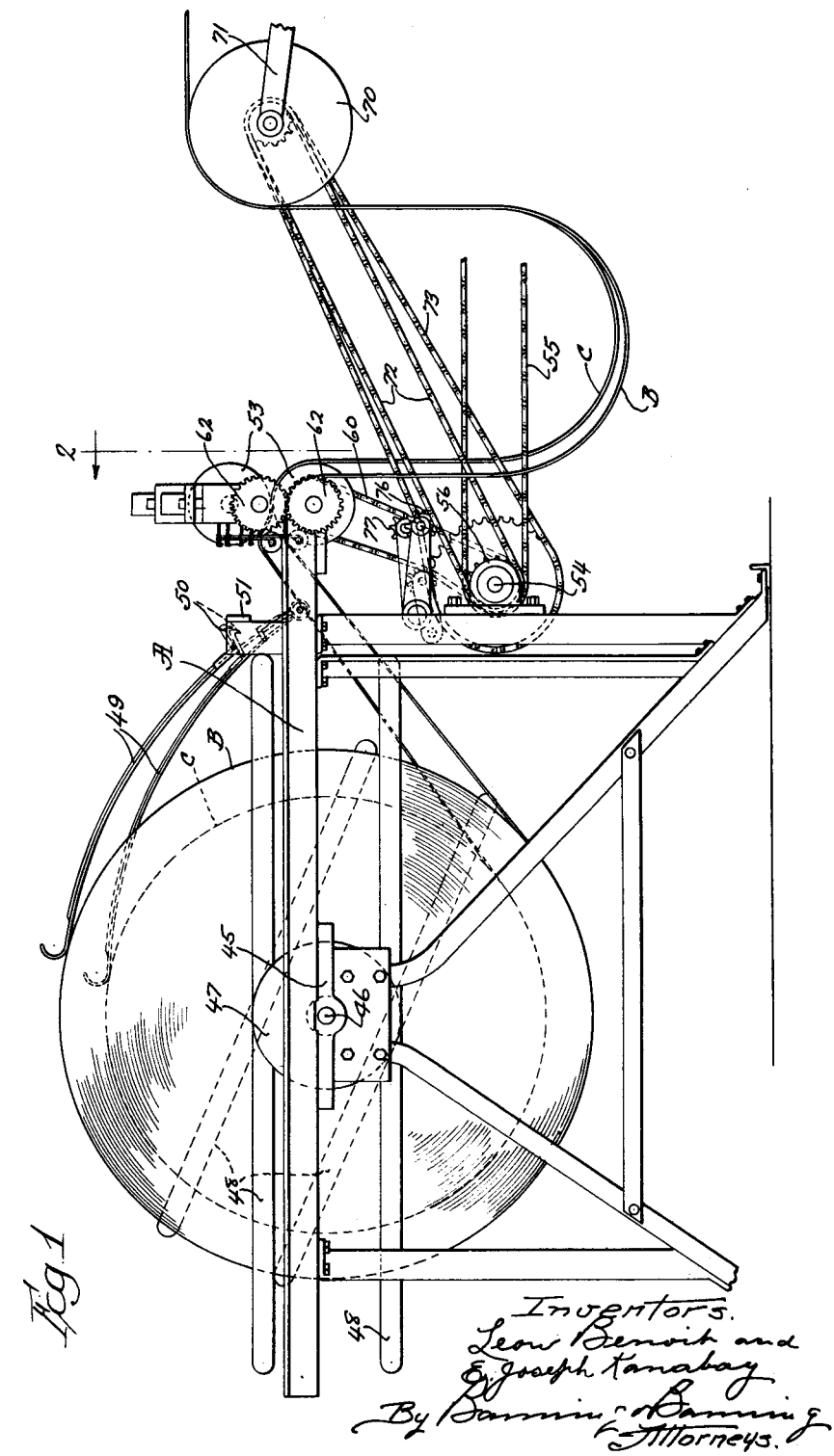
Figure 1 is a side elevation of the sheet delivering mechanism.

In order that the mechanism and the operations of the various parts thereof in producing the notched pieces and assembling them may be clearly understood, we shall first describe the notched pieces themselves and the filler formed thereby.

Referring to Figs. 28 to 30 inclusive, two series of interlocked notched cardboard pieces $b$ and $c$ comprise the filler formed by the machine. For convenience, the pieces $b$ will be hereinafter designated as "strips" and the pieces $c$ as "cards". The strips $b$ have oppositely disposed notches $b'$ and $b^2$ punched out of the edge portions, thereby leaving web portions $b^3$ between the notches. The end notches are placed in close proximity to the end edges of the strip and all of the notches are spaced equidistantly. The cards $c$ have notches $c'$ extending inward from one of their edges, which notches receive the web portions $b^3$ of the strips $b$ in the finished filler.

The entrances to the notches $c'$ are preferably tapered, as seen in Fig. 29, to facilitate the insertion of the strips $b$ into the notches $c'$ during the assembling operation of the machine, and one side edge of each notch $c'$ is formed with a shoulder $c^2$ adjacent the edge of the strip, which shoulder engages with the end edge of the notch $b^2$ of the strip $b$ when the strips are completely assembled, thereby forming an interlocking connection between the intersecting strips and cards and preventing any possible disconnection between them. The opposite edge of each notch $c'$ is formed with two oppositely inclined edge portions that provide a tongue $c^3$ which enters the space above the shouldered portion $c^2$ of the notch and acts to hold the web portions $b^3$ of the strip $b$ in interlocked condition between the upper end of the notch $c'$ and the shoulder $c^2$. Ventilating openings $c^4$ may be formed in the body of the card $c$, as shown in Fig. 29. When assembled, the strips $b$ extend parallel with each other and the cards $c$ extend parallel with each other and at right angles to the strips $b$, with the web portions $b^3$ received and held in the notches $c'$. In the completed carton filler the strips may be regarded as longitudinal walls or partitions and the cards as cross walls.

In the embodiment of the invention illustrated in the drawings, the machine is intended for the manufacture of egg carton fillers constructed as above described, although by slight variations and adjustments it may be altered to manufacture articles having intersecting walls of slightly different form. The machine illustrated embodies die press or punching mechanism at its receiving end arranged to punch notches and slots in the filler material which, if desired, may come from two rolls of filler material.

Beyond the punching mechanism is slitting or cutting mechanism which severs one of the long sheets of material into the required number of notched strips to form the longitudinal walls of the carton filler, which strips are intermittently fed by suitable feed mechanism into the lower member of an assembling mechanism preparatory to being assembled with cards severed from the other long sheet of filler material. Feed mechanism is provided for this other sheet of filler material, which feed mechanism feeds said sheet to a severing mechanism for severing the sheet transversely into the required number of cards to make up the cross walls of the finished articles. The upper assembling mechanism is provided with gripper heads that grip the severed cards after they have been turned by the severing mechanism in edgewise parallel relation to each other extending at right angles to the strips, after which the upper member of the assembling mechanism raises the gripper heads and carries them, together with the notched cards gripped therein, across the notched strips and thereafter moves the cards down over the strips and into interlocking engagement therewith, after which the assembled portions of the strips are severed from the remainder of the strips and the upper member of the assembling mechanism is moved back to its initial position, during which time the completed egg carton filler, or other assembled article, is discharged therefrom and carried away by a conveyor.

Figure 2:
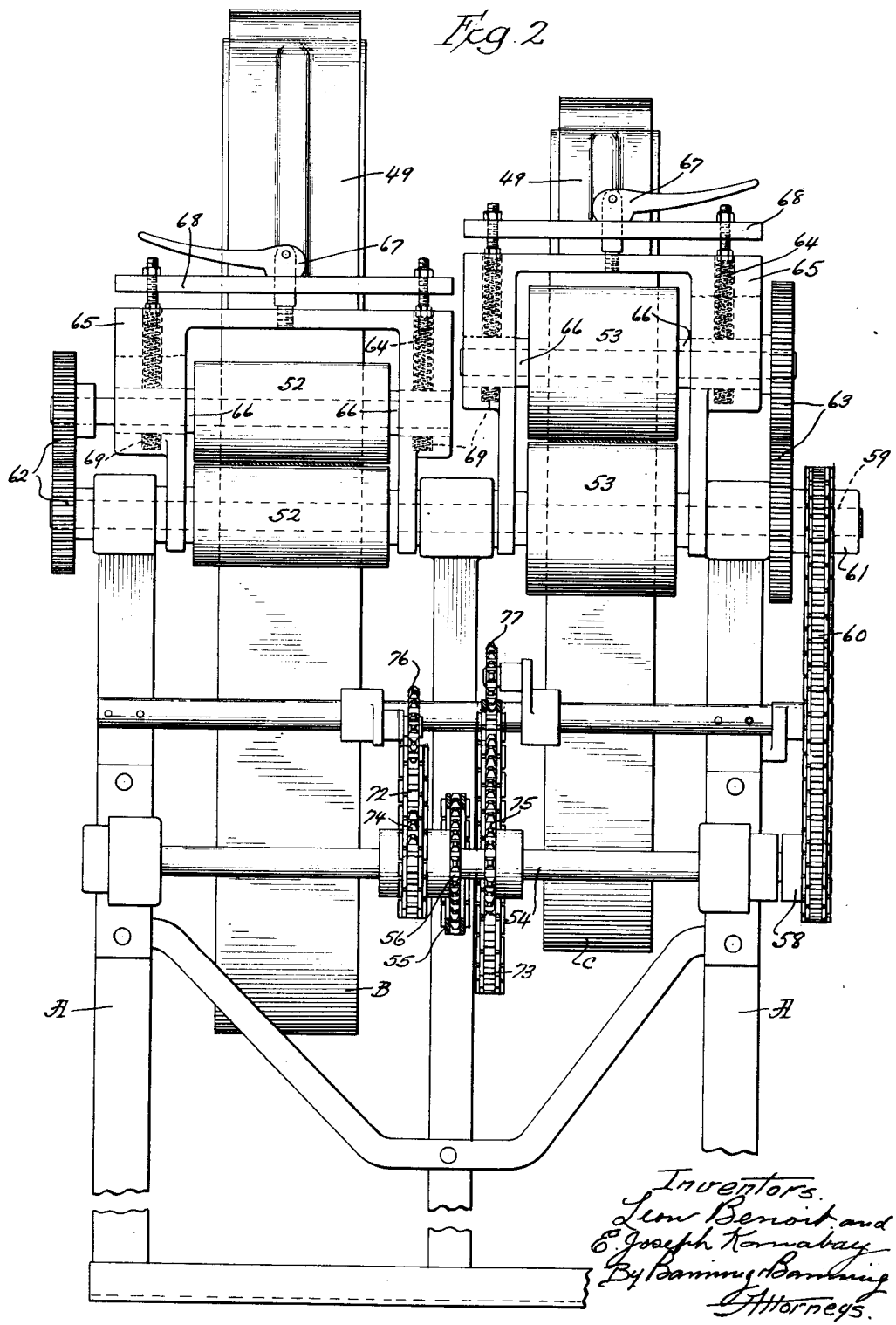
Fig. 2 is an enlarged end elevation of the same as viewed from the line 2 of Fig. 1.

The sheet delivery mechanism which will first be described is shown in Figs. 1 and 2 and comprises a frame A having bearings 45 in which is fitted a shaft 46 for supporting rolls of filler material such as cardboard sheets B and C, and rolls being held against shifting on the shaft by flange plates 47 having extensions 48 in the form of bars which extend beyond the periphery of the roll. Spring-pressed tension bars 49 bear against the outer convolutions of each roll to prevent overrunning of the rolls and to keep them taut on the roll. Each tension bar is provided with a pivoted hook 50 adapted to engage a cross bar 51 to hold the tension bars while new rolls of cardboard are being placed on the shaft 46.

As will later be explained, a greater length of sheet is required for the cross walls than is required for the longitudinal walls of each filler. The sheets are unrolled by pairs of rollers 52 and 53, the latter rollers 53 being somewhat larger in diameter for the purpose mentioned above. To drive the rollers, we provide a shaft 54 which is driven by a chain 55 through a sprocket 56, the chain being driven from a shaft 57 (see Fig. 8) which rotates at a constant speed. The shaft 54 is provided with a sprocket 58 keyed thereto which drives a shaft 59 through the chain 60 and sprocket 61. Each of the lower rollers 52 and 53 is keyed to the shaft 59, the upper roller 52 being driven by a pair of gears 62 one of which is keyed to the shaft 59 and the upper roller 53 being driven by a pair of gears 63 one of which is keyed to the shaft 59.

Each of the upper rollers is yieldingly held in contact with the sheet by springs 64 mounted in a yoke 65, the springs being adapted to bear against floating bearings 66 and held under tension by an eccentric hand lever 67 which bears against a bar 68. When it is desired to separate the rollers to insert new sheets, the hand levers are rotated substantially 180° from the positions shown in the drawings whereupon bars 68 may rise from the yoke, relieving the tension from the springs, so that the upper rollers are raised by short springs 69, thereby permitting a sheet to be easily inserted between the two rollers.

It will be noted that the rollers are driven at a constant speed, thus feeding the sheets continuously. However, the sheets are fed through the punching and assembling mechanism intermittently; thus the sheets B and C will form loops, as shown in Fig. 1, so that when the sheets are fed forward by the intermittent feed mechanism, the loops will be partially taken up. Rollers 70, supported from the main frame by brackets 71, are adapted to assist the feeding of the sheets into the punching mechanism, the rollers being driven by chains 72 and 73 from suitable sprockets 74 and 75, respectively, which are keyed to the shaft 54. Any suitable tension device may be employed to keep the chains taut, such as idler sprockets 76 and 77.

Referring now to Figs. 3 and 4, the reference character D designates die press or punching mechanism of conventional form which is located at the receiving end of the machine. The die press mechanism has a suitable bed plate 80 upon which are mounted two stationary dies 81 and 82 above which are the movable dies or punches 83 and 84 that co-operate with openings in the stationary dies 81 and 82 to punch out notches and slots of the required configuration in the two long sheets of cardboard or other filler material B and C which are delivered from the rolls, as previously described.

The movable dies or punches 83 and 84 are carried by heads 85 and 86 guided upon suitable guide members of the press mechanism and connected to the crank shaft 87 by one or more connecting rods 88. The crank shaft 87 of the press mechanism is journaled in standards 89 which comprise elements of the press frame, and said crank shaft 87 is driven from any suitable source of power applied to a wheel 90 mounted on the shaft 87. The punches 83 are shaped to punch out notches and slots in the filler material B of the configurations seen in Fig. 3, and the dies or punches 84 are shaped to punch out slots in the filler material C of the configuration, also seen in Fig. 3. During the slitting or cutting operation of the filler material, the notches and slots shown in the filler material B and C subsequently become the notches $b'$, $b^2$, and $c'$ of the form illustrated in Figs. 28 and 29.

Secured to the die press D and extending from the lower dies 81 and 82 thereof, is a table 91 over which the punched filler material is fed towards the slitting and assembling mechanism. Mounted on said table adjacent the punching dies is strip slitting mechanism E for the filler material B. The form shown comprises disk-like knives 92 mounted to move axially on a shaft 93 but made to rotate therewith by bolts 94 which extend through openings in collars 95 which are secured to the shaft. Within the openings are springs 96 adapted to abut nuts 97 on the bolt ends to hold the knives adjacent the collars. This assembly of knives is supported in suitable bearings 98 extending downwardly from a head 99 which is provided with trunnions 100, each being rotatably fitted in a block 101 which is slidable in standards 102, and yieldingly supported upon springs 103. One of the trunnions is provided with an arm 104 extending radially therefrom, the end of which is provided with a spring-pressed latch 105 adapted to enter an opening 106 in the standard to hold the head in its operative position. Such a construction permits the swinging of the knives out of cutting position, as indicated by broken lines in Fig. 4, and facilitates threading the sheet through the cutters when a new roll of cardboard B is placed on the machine.

Below the knives 92 are driven rotary knives 107 which are secured as by collars 108 to a shaft 109 journaled in suitable bearings 110 in the standards. The shaft 109 is driven by a chain 111 (see Fig. 8) which connects a sprocket 112 secured to the shaft 109 with a sprocket 112ª on an intermittently driven shaft 113. The knives cut through the filler material as the latter is fed forwardly through the machine, thereby slitting the filler material into the required number of strips to form the longitudinal walls of the completed filler or other article constructed by the machine. In a machine for constructing an egg carton filler having four longitudinal walls, as shown, three knives 92 may be employed, and said knives are spaced equidistant and located so as to slit or sever the filler material along the rows of slots seen in Fig. 3, thereby forming notched strips B' having the opposing notches $b'$ and $b^2$ in their opposite edges, as shown in Fig. 28. A fourth edge trimming knife 92 may be also employed.

Beyond the strip slitting mechanism E are feed mechanisms F and F' (see Figs. 7 to 11 inclusive) which operate to intermittently feed the two long sheets of filler material through the machine. Referring to the mechanism F which feeds the strips B', it comprises a lower drum 115 having annular grooves 116 having pins 117 intersecting the grooves in spaced relation to correspond with the slots $b^2$ in the strip. The drum is keyed to the shaft 113 which is driven intermittently by a chain 117 which is trained over a sprocket 118, keyed to the shaft 113, and a sprocket 119 which is loosely mounted on a constantly rotating shaft 120, the latter being driven by a chain 121 from the shaft 57. A single toothed ratchet 122 formed integrally with the sprocket 119 is abutted by a friction washer 123 which is forced against the face of the ratchet by a compression spring 124 which is backed by nuts 125 on the shaft. A dog 126 pivoted at 127 to the main frame G is adapted to contact the tooth on the ratchet to hold the sprocket 119 against rotation, and when the dog is released from the tooth the sprocket is rotated by the shaft 120 on account of the frictional engagement of the washer 123 with the face of the ratchet.

A spring 128 is adapted to normally hold the dog in a position to engage the tooth of the ratchet, and means for disengaging the same may comprise a rod 129 which is pivotally connected to the dog at 130, the opposite end being in close proximity to a flange 131 (see Fig. 10) keyed to the shaft 57, the flange having a cam 132 thereon adapted to abut the rod end and move it lengthwise, disengaging the dog from the ratchet tooth and permitting the sprocket 119 to rotate the drum 115 of the feed mechanism F one revolution, thereby advancing the several strips together with the remainder of the sheet B the necessary distance to provide strips having the required length of the carton filler, whereupon the dog again engages the tooth to arrest the motion of the drum 115.

Mounted slightly rearward from the shaft 113 and above the same is a secondary shaft 133 in parallel relation to the shaft 113 and driven thereby through a pair of equal sized gears 134, one gear being keyed to the shaft 113, and the other gear being keyed to the shaft 133. A drum 135, keyed to the shaft 133, is also provided with annular grooves 136 which are intersected by thin metallic strips 137 which are properly spaced to engage the notches $b'$ in the manner shown in Fig. 11. It will be noted that the two drums are placed in relation to the strip so that at all times one of the notches $b'$ or $b^2$ are engaged by either one of the metallic strips 137 or one of the pins 117. The strips B' are twisted substantially 90° to enter the grooves 136 in the drums, and thus they are fed in the upended position to the assembling mechanism J.

The feed mechanism F' for feeding the sheets C comprises a wheel 138 (see Figs. 7, 9 and 9a) having pairs of spaced radial pins 139 and keyed to a shaft 140, and a pair of spaced wheels 141 having radial pins 142 and keyed to a shaft 143 which is driven by the shaft 140 through two equal sized gears 144. The shafts 140 and 143 are intermittently driven by the shaft 120 and by mechanism identical with that described in connection with the feed mechanism F and need not be again described here. It will be noted that the wheels 138 and 141 are larger in diameter than the drums 115 and 135 because it is necessary with one revolution of the shaft 120 to feed a greater length of the sheet C which forms the cross walls than is required for the longitudinal strips. The pins 139 are adapted to engage in the middle notches $c'$, and the pins 142 engage in the outer notches $c'$. The wheels 138 and 141 are in staggered relation with respect to the sheet much in the same manner as the drums previously described, and for the same purpose.

The shaft 57 receives its motion from the shaft 87 of the mechanism through power transmitting mechanism which may comprise an upright shaft 145 journaled in bearings carried by a framework of the machine and geared to the shaft 57 by intermeshing beveled pinions 146 and 147 on the ends of said shafts 57 and 145. On the upper end of the shaft 145 is a beveled pinion 148 which meshes with a beveled pinion 149 fast on the end of a cam shaft 150 journaled in bearing brackets carried by the framework of the machine.

Upon one end of the cam shaft 150 is a gear wheel 151 which meshes with a gear wheel 152 fast upon a cam shaft 153 journaled in bearing brackets carried by the frame of the machine. A sprocket chain 154 trained over a sprocket wheel 155 (see Fig. 3) on the crank shaft 87 and a sprocket wheel 156 on the cam shaft 153 provides means for transmitting motion from the crank shaft 87 to the cam shaft 153. From the cam shaft 153 power is transmitted to the shaft 57 by the gearing described. Obviously other equivalent power transmitting gearing may be substituted for the one shown for transmitting power from the crank shaft 87 to the several cam shafts 57, 150 and 153.

Because of the length of connected shafting from the sprocket 156 through the shaft 153, gears 152 and 151, cam shaft 150, bevel gears 149 and 148, shaft 145, bevel gears 147 and 146, shaft 57, bevel gears 157 and 158, shaft 159, bevel gears 160 and 161, and cam shaft 162, it is desirable to connect the end of the shaft 162 more directly with the shaft 153. This may be accomplished by keying a gear 163 to the shaft 153 and having an idler gear 164 meshing therewith, the latter gear rotatable on a stub shaft 165. Adjustably secured to the gear 164 may be a sprocket 166 having a chain 167 trained thereover and extending around a sprocket 168 keyed to the end of the shaft 162. Thus it will be seen that the shaft 162 will be rotated in exact timed relation with the shaft 153, whereas, without the chain 167, the cam shaft 162 would tend to drag behind in its rotation due to a slight twisting in the several shafts.

Beyond the strip and sheet feeding mechanisms is a cross wall cutting and upending mechanism, indicated generally at H, (see Figs. 14, 15, 18a and 19) in which the filler material C is cut transversely to form the cards c that comprise the cross walls of the egg carton filler, or the like. The cards are thereafter assembled with the strips comprising the longitudinal walls of the filler in the mechanism indicated generally at J, thereby completing the article.

Referring more particularly to Figs. 14 and 15, the cutting mechanism comprises a bed plate 170 which is secured to the longitudinal portion of the main frame G. The bed plate is provided with semi-circular grooves 171 and fixed knives 172 adjacent each groove. Rigidly mounted along each side of the bed plate is a bearing plate 173 having circular openings 174 that provide bearings in axial alignment with the semi-circular grooves.

Mounted in axial alignment with the semicircular grooves are circular blocks 175 each having a central beveled slot 176 which is lined with plates 177 of hardened steel that extend beyond the blocks at the narrow end of the slot. Each block (there being one for each cross wall) is provided with trunnions 178 rotatably fitted in the circular openings 174 and is further provided at one end with a pin 179 extending outwardly to fit in slots 180 in a longitudinally movable bar 181 which, when moved, causes the blocks 175 to rotate in a manner presently to be explained.

The bar 181 is actuated by a lever 182 having pivotal connection therewith at 183, the lever being pivotally connected at 184 to the main frame G, the other end of the lever being connected by an adjustable link 185 to a bifurcated head 186 which straddles the cam shaft 162. Mounted on the head 186 is a roller 187 extending into a cam groove 188 in the face of a cam 189 which is keyed on the shaft 162 adjacent the bifurcated head 186.

Extending downwardly from the bed plate and on each side thereof are guides 190 in which are slidably fitted the legs 191 of a movable knife frame 192 which is in the form of a grate having cross bars 193 formed integrally therewith. Secured to each cross bar as by means of bolts are knives 194. The cutting edge of each knife (there being one for each cross wall) is in alignment with the cutting edge of its cooperating stationary knife 172. The lower ends of the legs 191 rest on a T-shaped support 195, the stem 196 of which is bifurcated at 196ª to straddle the shaft 162. Extending outwardly from the T-shaped support is a cam roller 197 fitted in a cam groove 198 in a cam 199 which is keyed to the cam shaft 162.

The operation of the above described mechanism is as follows: With the blocks 175 in the position shown in Figure 15, the sheet C is fed by the wheels 138 and 141 through the slots 176 in all the blocks, in the direction indicated by the arrow. The length of the sheet C which is used to form the required number of cards for a filler is the sum of the heights of all the cross walls. After the sheet is properly located with respect to the knives, the knife frame 192 is lowered by the cam 199 to sever each cross wall from the others and from the sheet, whereupon the frame 192 is raised to the position indicated in Fig. 15. It will be noted that each block 175 now supports one of the cards c, shown in Fig. 29. With the frame 192 in uppermost position, the bar 181 is actuated by the cam 189 to rotate the blocks 90°, to the position shown in Fig. 19, to upend the cross walls so that their upper edges are in position to be gripped and the cards removed from the cutting and upending mechanism H in a manner now to be described.

The cards c are removed from the cutting and upending mechanism by grippers, shown generally at 200, (see Figs. 8, 14, 15 and 16) the grippers being carried by a head 201 which, in turn, is carried by a swivel connection 202 on one end of an arm 203, the opposite end of which is carried by a swivel connection 204 which is secured to the uprights 89 on the punching mechanism (see Fig. 4). The arm 203 is adapted to be moved in a horizontal plane by a cam 205 (see Fig. 3) keyed to the shaft 150, there being a cam roller 206 secured to the arm which interruptedly engages in the cam groove, as shown in Figs. 3 and 8. Extending laterally from the arm and on each side thereof are cam rollers 207 and 208 which are adapted to engage cams 209 and 210, respectively, said cams being keyed to the shaft 153. The cams 209 and 210 are adapted to move the arm in one of two vertical planes in a manner later to be described.

The head 201 is provided with guides 211 (see Fig. 14) which are slidable in an arch-shaped guide frame 212 in both horizontal and vertical planes. As shown in Fig. 14, the legs of the guide frame are supported on the main frame of the machine and the arch frame extends transversely thereof in position to permit certain of the parts carried thereby to be lifted on one side of the machine and then transported across the machine and lowered on the other side thereof in the manner presently to be described. Extending upward from the guide frame and centrally thereof is a standard 213 having springs 214 attached to the upper end thereof and the other end attached to the arm and head, as shown in Fig. 8, said springs being adapted to compensate for the weight of the head and grippers on the end of the arm.

The head is provided on its lower side with a dovetail rib 215 extending longitudinally of the machine upon which is slidably mounted a series of inverted U-shaped hangers 216, each hanger having a slotted bar 217. Gripping pins 218 which normally traverse the slot are provided with teeth 219 to aid in gripping the cards. Each pin is urged into engagement with the card by a spring-pressed pin 220 loosely held in a rockable shaft 221 having end bearings in the hanger and provided at one end with a projecting pin 222 which is engaged with a pin 223, the purpose of which will presently be described. It will be seen that with the gripping pins 218 in the position shown in Fig. 18 the hanger may be moved downward so that the nose of the pins strikes the upper end of the cards, whereupon the gripping pins are raised to permit the card to enter the slot, as shown in Fig. 19, and as the hanger is raised, the teeth of the gripping pins will clamp the card against the opposite wall of the slot and hold the same until the gripping pins are withdrawn.

When forming a carton filler or other article in which the cross walls are of greater height than the distance between them, and in which the cross walls are cut from a long sheet or length of filler material, as in the present case, it is necessary to reduce the spacing between the cards c, while held in the gripper heads, into positions corresponding with the distances between the notches of the strips b, thus closing up the ranks as it were, and this is accomplished by equalizing mechanism, which will now be described.

For equalizing the distance between all of the grippers, the endmost hangers are provided with means for moving the intermediate grippers (with the exception of the middle one which is made stationary on the head 201) and said means, as shown, comprises drag links 225 (see Fig. 20ª) each connected to an endmost hanger as by a lug 226 entering a notch in the top of the end hangers. The drag links slide in grooves 229 in the head 201, and are provided with other lugs 227 and 228 that enter elongated notches 230 and 231 in the intermediate hangers. The notches in the hangers, and the lugs of the drag links, provide lost motion connections between the intermediate hangers and the endmost ones enabling the latter to move the intermediate hangers the required distance to space all the grippers apart equidistantly. When the hangers are moved close together, as seen in Fig. 16, the endmost hangers abut the adjacent hangers which in turn abut the next set of hangers, thus moving all the hangers in close proximity to each other and to the central hanger which is secured to the head 201. With the hangers in this position, each gripping a cross wall c, the cross walls will be brought into spaced relation and in alignment with the notches $b'$ in the strips $b$.

One of the endmost hangers is provided with a bracket 232 (see Fig. 7) extending outwardly therefrom on which is mounted a roller 233 adapted to ride in a cam groove 234 in a bracket 235 which is supported by the frame G. The cam groove is shaped so as to shift the hangers on one side of the center of the head, as the head is moved to and from the cutting and upending mechanism. The other endmost hanger is similarly moved by means comprising a lever 236 pivoted in its center on a stud 237, (see Fig. 20$^a$) the ends of the lever being connected by links 238 to each of the endmost hangers. Thus it will be seen that as the bracket 232 is moved by the cam 235 to move the endmost hanger, the link connection imparts an opposite movement to the hangers on the other end of the head thus closing the spacing equally from both sides of the series of hangers.

After the cards $c$ have been gripped in the gripper heads 217 and the latter raised, the gripper heads are moved across the machine to the lower member of the assembling mechanism J and depressed to thereby assemble the cards with the strips to complete the carton filler. The lower member of the assembling mechanism J will now be described.

This lower member contains a number of vertically slotted longitudinally extending guide blocks 236 and 236$^a$ (see Figs. 14, 21 and 22) arranged in rows, four rows being shown, and the slots of said blocks form channels for receiving the end portions of the strips B'. Except during the interval that the members of a carton filler or other article are being assembled, the slotted guide blocks 236 and 236$^a$ are inclined slightly, as seen in Fig. 14, but during the assembling of the article, the guide blocks are moved into the upright position, seen in Fig. 21, the purpose of which will be hereinafter explained.

The guide blocks are formed with downwardly projecting tail pieces 237 which are rockingly mounted in slides 238 and 238$^a$ that are capable of movement transversely of the machine and are slidably guided in the slots of a slotted guide member 239 which is preferably formed as a part of the table or platform 91. The tail pieces 237 are formed with trunnions or short shafts 237$^a$ that are journaled in bearings formed in the slides 238 and 238$^a$ to permit the rocking movement of the guide blocks 236 and 236$^a$. An operating block 240 is interposed between the two tail pieces in each slide and a coiled compression spring 241 is provided in a groove in the slotted guide member 239 between one of the tail pieces and an end of said groove. The purpose of this arrangement is to impart synchronous parallel movement to the two guide blocks operated by each slide 238 and 238$^a$. The means for moving the slides in the direction to straighten up the guide blocks comprises cam faces 242 formed upon the hangers 216 which engage with upstanding lugs 243 and 243$^a$ formed on the slides. The cam faces 242 are arranged to engage with the lugs 243 and 243$^a$, while the cards $c$ are being inserted into the slots of the strips $b$.

Guide bars 244 are placed behind the upright lugs 243 and 243$^a$ and the ends of the hangers 216 having the cam faces 242 pass down between the guide bars and the lugs 243 and 243$^a$, as is shown in Fig. 21. In order to hold the guide blocks 236 and 236$^a$ in an upright position until the assembled carton is removed therefrom, we provide a locking mechanism shown in detail in Figs. 21 to 26 inclusive which comprises a plunger 245 slidably mounted in an upright 246, and having a ball 247 abutting one end thereof, the ball being normally positioned so that a portion thereof extends beyond the edge of the upright and in the path of one of the hangers 216, as is shown in Fig. 24. The plunger is provided with a laterally extending pin 248 adapted to move within a slot 249 in a bar 250 which is rigid with and extends upwardly from a longitudinally shiftable locking bar 251.

The pin 248 also serves as a pivotal connection between the plunger and a lever 252 (see Fig. 23) which is secured at one end to a rock shaft 253 having bearings 254 secured to the slotted guide member 239. Each of the lugs 243 is connected by bolts 255 and spacers 256 to a notched bar 257, the notches of which are normally in alignment with tongues 258 on the locking bar 251. By referring to Fig. 21, it will be seen that as the cam surfaces 242 move the lugs 243 inwardly toward one another the notched bar 257 is moved laterally therewith so as to disengage the notches of the bar 257 from the tongues 258, thereby permitting the locking bar 251 to shift longitudinally on the shouldered screws 259, as seen in Fig. 26, and lock the bars 257 and the lugs 243 against outward movement. The means for shifting the locking bar comprises a spring 260 interposed between projections on the bar 250 and the lever 252.

It will be understood that similar mechanism is mounted on the lugs 243$^a$ to lock the same coincidentally with the lugs 243. Figs. 24, 25 and 26 illustrate the manner in which the hangers operate the locking mechanism which is as follows: As the hangers are lowered to interlock the cross walls with the longitudinal walls, the endmost hanger strikes the ball 247, which normally lies in the downward path of the hanger, to move the plunger and rock the lever 252 and compress the spring 260. As the hangers are further lowered so that the cams 242 move the lugs 243 and 243$^a$ inwardly, the notched bars 257 disengage the tongues on the locking bar 251 whereupon the spring 260 shifts the locking bar to a position shown in Fig. 26. On the return movement of the hangers, the endwise hanger is moved upwardly disengaging the ball 247, and then moved horizontally. A roller 261 mounted on an offset lever 262, which is pivotally supported by a bearing 263, has one end of the lever abutting the end of the plunger, so that as the plunger is shifted, as shown in Fig. 25, the roller 261 is moved to a position in the horizontal path of the hanger and where it is engaged by the hanger when the latter is moved horizontally.

As the hanger strikes the roller, the lever 262 moves the plunger to the position shown in Fig. 24 and in doing so shifts the locking bar, by virtue of the pin 248 engaging the end of the slot 249, thus shifting the locking bar so that the tongues are aligned with the notches in the bar 257, whereupon the springs 241 move the guide blocks 236 and 236$^a$ to an angular position, as in Fig. 14, which movement causes the lugs 243 and 243$^a$ to move adjacent the guidebars 244. The purpose of shifting the guide blocks is to insure the interlocking engagement between the webs $b^3$ of the strips with the shoulders $c^2$ of the cards, and the purpose of the locking mechanism is to hold the guide blocks in a vertical position while the assembled carton is being removed from the assembling mechanism.

Between the pairs of guide blocks 236 and

236ᵃ are upstanding lugs 265 which are supported from the slotted guide member 239, and said lugs form stops or abutments for the upper ends of the guide blocks, whereby when the slides 238 and 238ᵃ are moved by the cam faces 242 to straighten up the guide blocks, the upper ends of the latter will encounter the stops or abutments 265 after which the continued movement of the slides acts to move the guide blocks from the inclined position, seen in Fig. 14, to the upright position seen in Fig. 21.

The slotted guides 236 and 236ᵃ hold the upper edges of the notched strips in inclined relation and in position to receive the tapering inlets to the slots $c'$ of the cards $c$, and as the cards are moved down across the strips, the inclined strips receive the notches $c'$ through said tapering ends of the notches, thereby permitting free passage of the shouldered portion $c^2$ and registering of the main parts of the notches. Because of the inclined position of the strips, there is no danger of bending or distorting the shouldered parts $c^2$ of the notches $c'$. However as the cards are moved downwardly, the cam faces 242 of the hangers move the slides inwardly, thereby straightening up the guide blocks and bringing the strips into upright position with the web portions $b^3$ thereof contained in the notches $c'$ between the upper ends of the notches and the shouldered portions $c^2$, in which position the cards and strips are interlocked.

While the cards are being assembled with the strips, the portions $b$ of the strips B' that form the filler are severed from the remainder of the strips by a knife 266 which is slidably mounted on a guide block 267 for reciprocal movement thereon in a horizontal direction.

The guide block 267 is provided with augularly disposed slots 268 (Figs. 12 and 13) through which the strips $b$ are fed to the slotted guide blocks 236 and 236ᵃ. The knife is provided with triangularly shaped openings 269, the hypothenuse of each opening being parallel with the slots 268 in the guide blocks, and the vertical edge 270 of the opening being the cutting edge of the knife which co-operates with the edge of the slot 268 to sever the portions $b$ of the strips forming the egg carton filler from the remainder of the strips B'. The knife is slidably held against the guide block by bolts 271 which extend through slots 272 in the knife, the knife being shifted by an adjustable link 273 connected to the free end of the lever 274 (see Figs. 8 and 10) pivoted at 275 and having a roller 276 intermediate its ends and fitted in a cam groove 277 in the cam 278 which is keyed to the shaft 162.

As previously described, the arm 203 which carries the card transferring mechanism is movable in horizontal and vertical planes and the head 201 is provided with guides 211 which slide in grooves in a guide frame 212. Due to the fact that the head and the hangers attached thereto are of considerable weight, and that the arm travels at a considerable speed, we find it desirable to provide additional guiding means for the head, particularly when it is moved vertically. This means may comprise pins 280 extending downwardly from each end of the head (see Figs. 7 and 8) which are adapted to enter holes 281 in cross bars 282 which are supported by the platform 91. By referring to Fig. 8, it will be seen that the ends of the pins 280 may be moved horizontally over the top of the bars and when moved vertically they enter one of the selected openings 281 therein to hold the head 201 steady.

As the head reaches the end of its horizontal path and starts to move downwardly, it has a tendency to chatter or bounce back from the vertical portion of the guide frame 212. To overcome this difficulty, we provide on each side of the frame a dash pot 283 shown generally in Fig. 7 and in detail in Fig. 27, and as both are substantially alike, we shall describe but one.

The dash pot comprises a cylinder 284 having a piston 285 therein to which is connected a piston rod 286 which extends through the guide frame to lie in the path of the head. The cylinder is provided with a head 287 having an opening 288 therein and is further provided with an adjustable valve 289 fitted adjacent the head inside the cylinder. The valve may be adjusted with respect to the cylinder head by an adjustable bushing 290 and lock nuts 291 to restrict the air passage between the valve and cylinder head. A coiled spring 292 is interposed between the piston and the valve to normally hold the piston away from the cylinder head. As the head 201 approaches the end of its horizontal travel, it abuts the piston rod to compress the air within the cylinder, the pressure being slowly dissipated between the valve and head and out through the openings 288, as indicated by the arrows.

We use the air pressure within the cylinder for another purpose, namely, to positively hold the head 201 from tending to bounce back after striking the piston rod. A pipe 290 communicating with the interior of the cylinder is connected at its other end to a small cylinder 291 in which is fitted a piston 292 having an extension 293, normally withdrawn from the path of the head 201 by a spring 294, said extension being adapted to enter an opening 295 in the head 201 and hold the same against bouncing back in a horizontal plane. As the head is moved downwardly, the spring 294 then returns the extension within the cylinder 291 as the pressure is dissipated from the cylinder 284.

A conveyor shown in the form of an endless chain (see Figs. 8, 14, 16, 17, and 31 to 38 inclusive) is provided to receive the assembled fillers and convey them to any suitable stacking or packaging mechanism (not shown). The chain is located between the upending mechanism H and the assembling mechanism J and is mounted to travel above the platform 91. Referring to Fig. 8, the chain 300 is trained over idlers 301, 302, a spring-pressed idler 303, and an intermittently driven sprocket 304 mounted on the shaft 305. The mechanism for driving the shaft 305 comprises a friction drive on the shaft 305 much the same as the friction drive mechanism shown in Fig. 10, and which is described in connection with the intermittent feed for the strips B'. The friction drive is driven by a chain 306 which is, in turn, driven from a sprocket (not shown) keyed on the shaft 162.

The chain is provided with grippers arranged in groups of three for engaging the second, fourth and sixth cross walls of each filler. Each gripper comprises a bearing 307 rigidly mounted at one end to a boss 308 extending laterally from a chain link. The bearing is provided with a central bore 309, one side of which is inclined upwardly and outwardly toward the upper end thereof to form an oval-shaped bore towards the upper end.

Rotatably mounted in the bearing is a pair of complementary semi-circular fingers 310 and 311, each being provided with a shoulder 312 for abutting the top of the bearing. The finger 310 extends below the bearing to receive an L-shaped lever 313 which is adapted to turn the fingers when engaged by cams and to secure the fingers within the bearing. The upper edge of each finger is beveled as at 314 to assist in receiving therebetween the cross walls c. Fitted between the fingers is a shim 315 slightly thicker than the cross wall c for leaving a slot therebetween.

A pin 316 is tightly fitted in the finger 310 and extends through an enlarged opening 317 in the finger 311, which pin prevents the latter finger from being removed from the bushing, and, further, the pin is adapted to abut one of two pins 318 to limit the turning movement of the fingers. This finger 310 is provided with a spring-pressed detent 319 which is slidably fitted in a socket disposed at an angle to the flat surface of the finger. The detent is provided with teeth 320 for gripping the cards and is retained within the socket by a plug 321 adapted to abut the outermost end of the detent when the latter is in its uppermost position.

The grippers are adapted to move with the chain and in the course of travel engage cams to turn the lever 313 in one or the other of the two positions, as shown in Figs. 37 and 38. It will be noted that the axis of the oval-shaped bore in the bearing is angular with respect to the chain. Therefore, as the fingers are turned so that their flat surfaces are at right angles to the axis, the fingers may be spread apart by a spring 322 interposed between the two, and as the fingers are turned from the above position, the oval mouthed bore acts as a cam to close the fingers against the tension of the spring.

Mounted on the platform 91 are two fixed cams 325 and 326 (Figs. 31 and 34), the cam 326 being mounted to engage the long arm of the lever 313 and close the fingers, whereas the cam 325 is mounted on the opposite side of the grippers and is adapted to engage the short arm of the lever to open the fingers. A double cam 327 is mounted to be moved relative to the platform and in the line of travel of the levers 313. A slotted stripper 328 is mounted with its end in close proximity to the chain so as to strip the filler from the fingers after the fingers have released their grip on the cross walls.

The cam 327 is moved by a lever 329 pivoted intermediate its ends at 329ᵃ, one end of the lever being pivotally connected to a pin 327ᵃ secured to the cam 327, the other end of the lever being located in the path of a cam 329ᵇ secured to the shaft 162. The chain is advanced until the first grippers in a group have passed beyond the cam 327, whereupon the cam 329ᵇ raises the cam 327 into the path of the L-shaped levers 313 on the grippers which are second and third in the group (see Fig. 8). As the chain is further advanced, all three grippers are released from the filler simultaneously by the cams 325 and 327. The filler is stripped from the grippers as the latter pass through the slot in the stripper 328 and below the same, at which time each of the gripper fingers in successive order is closed by the cam 326.

The means for releasing the filler from the grippers 217 (Figs. 19 and 20) so that the filler may be transferred to the chain comprises headed pins 330 slidably mounted in the hangers 216, each pin having its small end beveled as at 331, which bevel is in contact with the pin 223 previously described. The pin 330 in each hanger is in alignment with the adjacent pin so that when the end pin (Fig. 20) strikes a stationary cam 332, as the hangers are lowered directly over the chain, all of the pins 330 are shifted endwise to move the pins 223 downwardly against the springs 333 to rock the shaft 221 which, in turn, lifts the gripping pins 218 to release the cross walls of the fillers. In order to eject the carton when released, we mount springs 334 within the slots which springs bear upon the edges of the cross walls while being gripped by the pins 218.

In operation, the arm 203 raises the hangers from the assembling mechanism, then is moved horizontally by the cam 205 until the hangers are directly over the chain whereupon the movement of the arm is arrested horizontally and a cam 325 which is keyed to the shaft 153 strikes the top of the arm, thereby moving the same downwardly so that the projecting pin 330 (Fig. 20) engages the cam 332, thus releasing the filler which is at the same time gripped by the fingers on the conveyor chain.

We provide means in the form of a platform 336 over which the chain runs for lifting the chain so that the fingers may grip the cross walls (see Figs. 14, 16 and 17). The platform is suitably channeled on top to fit the contour of the chain and is mounted on a central stem 337 moving in a bearing 338, the stem being adapted to be moved longitudinally by a cam 339 which is keyed to the shaft 162. Other guide pins 340 extend downwardly from the platform to guide the same in its movement. Preferably a cap 341 in the form of an angle iron is placed over the chain to prevent the same from getting out of the channel on the platform. The platform is raised simultaneously with the lowering of the filler into the gripper fingers on the conveyor chain. When the filler is released from the hangers, the platform is lowered and the sprocket 304 advances the chain somewhat more than the length of a carton.

In the operation of the machine, two sheets of cardboard or other carton filler material of indefinite length are fed from the delivering mechanism into the machine at the receiving end thereof where the die press mechanism punches out the notches and slots, seen in Fig. 3. During the punching operation, the material is at rest, and immediately after the punching operation the feeding devices feed a length of both notched sheets into the assembling mechanism, the punched sheet B passing the severing mechanism E and being severed into the individual notched strips B' which enter the channels of the slotted blocks 236 and 236ᵃ where said notched strips stand in slightly inclined planes.

The sheet C is fed through the slotted blocks 175 and the knives 194 and 172 cut the sheet into cards which are up-ended so as to be gripped by the grippers in the hangers as the head 201 is lowered by the arm 203. Thereupon, the eccentric part of the cam 209 raises the arm 203 and parts carried thereby. As the gripper hangers are moved horizontally by the cam 205, the cam 235 actuates the endmost hanger, thereby adjusting the gripper hangers to bring the cards into properly spaced relation to enter the notches of the strips. The cards are transferred to the other side of the machine in position above the lower member of the assembling mechanism, whereupon the roller 208 of the operating arm enters the cam grooves of the cam 210, and, as a consequence, the arm is depressed, thereby bringing the notches c' of the cards c through the notches b' of the strip b and across the webs b³ thereof.

Since the strips are held in their inclined position they freely enter the tapering ends of the notches $c'$ and pass by the shouldered portions $c^2$ without bending or distortion, and as the cards continue their downward movement, the cam faces 242 of the hangers encounter the lugs 243 and 243$^a$ of the slides 238 and 238$^a$, thereby moving said slides and straightening up the slotted blocks 236 and 236$^a$ and permitting the webs $b^3$ of the strips $b$ to pass the shoulders $c^2$ whereupon the cards and strips become interlocked.

At this point in the operation of the machine, the knife is actuated, thereby shearing the assembled parts of the strips from the remainder and the cam 210 raises the operating arm and therewith the gripper hangers which carry with them the completed carton filler. The operating arm is raised until the gripper hangers are again brought to their uppermost position, whereupon the cam 205 moves the lever back towards its initial position, but when the lever reaches a position where the completed carton filler is suspended over the conveyor chain 300, the nose of the cam 335 encounters the operating arm and depresses it slightly, so that the gripping mechanisms I release the assembled filler. This release is effected by the endmost pin 330 which contacts the cam 332 whereupon the pins 330 are shifted to release the pins 218 from contact with the several cross walls. The filler is gripped by the conveyor chain when released from the hangers, after which the springs 214 lift the arm 203 into its normal horizontal plane and the cam 205 continues to move the arm to the end of its horizontal stroke, at which time the roller 207 thereof enters the cam groove in the cam 209 and the lever and parts carried thereby are depressed to the initial or starting position above mentioned.

In Fig. 39 we have shown a modified form of assembling mechanism in which two small fillers each having one-half the number of cells as that previously described may be assembled simultaneously. This necessitates the use of one additional hanger 216$^a$, the two center hangers being placed close together and secured to the head 201$^a$. It will be noted that the strips $b^4$ are slotted to provide two central slots close together and between which the strips are cut to separate the assembled fillers simultaneously with the cutting of the strips from the strips $B''$. The latter cutting mechanism is the same as previously described having a slotted block 267$^a$ and a knife 266$^a$ adjacent the block and slidable relative thereto. In the center of the filler, we provide a relatively thin stationary guide block 267$^b$ having slots as previously described, and a shiftable knife 266$^b$ co-operating therewith to cut the strips, thereby forming two separate fillers.

It will of course be understood that all of the mechanisms above described are operated in properly timed relationship and that the work proceeds automatically throughout all stages of the assembling operation. In claiming the invention, however, it is not the intention, unless otherwise indicated, to limit the assembling features of the machine to use in combination with feeding and punching mechanisms of the character described, or to cutters which sever the longitudinal wall forming strip of material into a plurality of sections, in transit, since if desired the cutting of the aforesaid strip and the punching of both of the strips might be performed on separate machinery and the prepared strips fed to the assembling mechanism in the manner described, although the complete method and mechanism described possess numerous advantages, particularly in that the punching of the notch forming apertures is performed immediately in advance of the assembling operation, so that the cross cutting of the cross wall forming strip will necessarily occur along the intended lines to form the open notches and the sections will maintain correct register until the assembly is effected.

Moreover, it is not the intention, unless otherwise indicated, to limit the claims to mechanism for assembling a group of cross walls with a group of longitudinal strips, since the principle of assembling is one which might be employed in the assembling of single longitudinal and cross sections intended as constituents of a carton or other structure, and it will also be understood that the claims are not necessarily to be limited to use for which the assembled unit is intended and that the term carton is intended to cover and embrace any carton-like form of container or the like in which compartments are formed by longitudinal and cross partitions intersecting one another and held in interfitted relation in any suitable manner.

It will also be understood that in the claims the expressions defining directional movements are used in a relative rather than an absolute sense, and that such expressions as "raising" and "lowering", "edgewise" and "flatwise", have no necessary reference to the plane of the earth's surface, but merely to the general structure and plan of operation of the machine and motions in relation thereto, and that numerous modifications in detail of mechanical structure are in contemplation.

We claim:

1. In a machine of the class described, means for forming cross wall sections which include a group of rotatably mounted guide members standing in parallel spaced relation to one another, each guide member having a slot therethrough and the group of guide members normally presenting their slots in aligned relation to permit passage therethrough of a strip of cross wall forming material, a group of cutters associated with said guide members and positioned to sever sections of material on lines intermediate the guide members, means for rotating said guide members in unison to upend the sections thus severed, and a group of movable grippers adapted to move to position to engage the upended sections and remove and transport the same from the slotted guide members.

2. In a machine of the class described, means for forming cross wall sections which include a group of rotatably mounted guide members standing in parallel spaced relation to one another, each guide member having a slot therethrough and the group of guide members normally presenting their slots in aligned relation to permit passage therethrough of a strip of cross wall forming material, a group of cutters associated with said guide members and positioned to sever sections of material on lines intermediate the guide members, means for rotating said guide members in unison to upend the sections thus severed, a grooved base member for the rotatable guide members having a semicircular concentric groove adjacent each of said guide members to support the lower edge of the severed section during the upending operation, and a group of movable grippers adapted to move to position to engage the upended sections and remove and transport the same from the slotted guide members.

3. In a machine of the class described, means for forming cross wall sections which include a group of rotatably mounted guide members standing in parallel spaced relation to one another, each guide member having a slot therethrough and the group of guide members normally presenting their slots in aligned relation to permit passage therethrough of a strip of cross wall forming material, a group of cutters associated with said guide members and positioned to sever sections of material on lines intermediate the guide members, means for rotating said guide members in unison to upend the sections thus severed, and a group of movable grippers adapted to move to position to engage the upended sections and remove and transport the same from the slotted guide members, lost motion connections between the grippers, and means for actuating the same to respace the grippers during the transporting operation.

4. In a machine of the class described, means for forming cross wall sections which include a group of rotatably mounted guide members standing in parallel spaced relation to one another, each guide member having a slot therethrough and the group of guide members normally presenting their slots in aligned relation to permit passage therethrough of a strip of cross wall forming material, a group of cutters associated with said guide members and positioned to sever sections of material on lines intermediate the guide members, means for rotating said guide members in unison to upend the sections thus severed, a grooved base member for the rotatable guide members having a semi-circular concentric groove adjacent each of said guide members to support the lower edge of the severed section during the upending operation, and a group of movable grippers adapted to move to position to engage the upended sections and remove and transport the same from the slotted guide members, lost motion connections between the grippers, and means for actuating the same to respace the grippers during the transporting operation.

5. In a machine of the class described, means for forming cross wall sections which include a group of rotatably mounted guide members standing in parallel spaced relation to one another, each guide member having a slot therethrough and the group of guide members normally presenting their slots in aligned relation to permit passage therethrough of a strip of cross wall forming material, a group of cutters associated with said guide members and positioned to sever sections of material on lines intermediate the guide members, means for rotating said guide members in unison to upend the sections thus severed, and a group of movable grippers adapted to move to position to engage the upended sections and remove and transport the same from the slotted guide members, a lost motion drag link engaging each of the grippers, and means for actuating said link during the transporting operation to impart varying degrees of movement to the respective grippers to respace the same.

6. In a machine of the class described, means for forming cross wall sections which include a group of rotatably mounted guide members standing in parallel spaced relation to one another, each guide member having a slot therethrough and the group of guide members normally presenting their slots in aligned relation to permit passage therethrough of a strip of cross wall forming material, a group of cutters associated with said guide members and positioned to sever sections of material on lines intermediate the guide members, means for rotating said guide members in unison to upend the sections thus severed, a grooved base member for the rotatable guide members having a semi-circular concentric groove adjacent each of said guide members to support the lower edge of the severed section during the upending operation, and a group of movable grippers adapted to move to position to engage the upended sections and remove and transport the same from the slotted guide members, a lost motion drag link engaging each of the grippers, and means for actuating said link during the transporting operation to impart varying degrees of movement to the respective grippers to respace the same.

7. In a machine of the class described, the combination of means for bringing a longitudinal wall forming strip into edgewise standing position at the place of assembly, means for bringing a cross wall forming strip into flatwise relation at the place of assembly, a group of rotatable slotted guide members journaled with their axes transverse of the line of movement of the cross wall forming strip and normally turned to bring their slots into alignment to permit passage of the strip therethrough, cutters associated with the rotatable guide members and positioned to sever the material along lines intermediate the guide members to form cross wall sections in preparation for the upending of said sections by the turning of the guide members, means for turning said guide members, a grooved base member provided with a semi-circular groove under each of the guide members to position the severed cross wall sections during the upending operation, a hanger carrying a group of grippers, each gripper being normally positioned to engage and grip an upended section, and means for lifting said hanger with the gripper carried thereby and transporting the same laterally and lowering the same to engage the cross wall sections with the edgewise standing longitudinal strip.

8. In a machine of the class described, the combination of means for bringing a longitudinal wall forming strip into edgewise standing position at the place of assembly, means for bringing a cross wall forming strip into flatwise relation at the place of assembly, a group or rotatable slotted guide members journaled with their axes transverse to the line of movement of the cross wall forming strip and normally turned to bring their slots into alignment to permit passage of the strip therethrough, cutters associated with the rotatable guide members and positioned to sever the material along lines intermediate the guide members to form cross wall sections in preparation for the upending of said sections by the turning of the guide members, means for turning said guide members, a grooved base member provided with a semi-circular groove under each of the guide members to position the severed cross wall sections during the upending operation, a hanger carrying a group of grippers, each gripper being normally positioned to engage and grip an upended section, and means for lifting said hanger with the gripper carried thereby and transporting the same laterally and lowering the same to engage the cross wall sections with the edgewise standing longitudinal strip, a lost motion connection between the grippers, and means for actuating said connection during the transporting operation to respace the grippers to the desired spacing for the cross walls.

9. In a machine of the class described, the combination of means for advancing a strip of longitudinal wall forming material and bringing the same into edgewise standing relation at the point of assembly, means for advancing a strip of cross wall forming material and bringing the same into flatwise relation at the point of assembly, means for severing and upending the cross wall sections cut from the last named strip, a hanger provided with grippers adapted to engage the upended cross wall sections, means for lifting the hanger and transporting the same laterally to bring the cross wall sections into register with the longitudinal wall forming strip, dash pot mechanism adapted to cushion the movements of the hanger, pneumatically operated locking means actuated by the movements of the dash pot mechanism for temporarily locking the hanger in position.

10. In a machine of the class described, the combination of means for advancing a strip of longitudinal wall forming material and bringing the same into edgewise standing relation at the point of assembly, means for advancing a strip of cross wall forming material and bringing the same into flatwise relation at the point of assembly, means for severing and upending the cross wall sections cut from the last named strip, a hanger provided with grippers adapted to engage the upended cross wall sections, means for lifting the hanger and transporting the same laterally to bring the cross wall sections into register with the longitudinal wall forming strip, dash pot mechanism adapted to cushion the movements of the hanger, locking means for the hanger including a spring pressed piston having a locking pin extension, a cylinder within which the piston operates, and a pipe connection with the dash pot mechanism for utilizing compressed air from the dash pot for projecting the locking pin extension against the spring to temporarily lock the hanger.

11. In a machine of the class described, the combination of means for advancing a strip of longitudinal wall forming material and bringing the same into edgewise relation at the place of assembly, means for bringing a strip of cross wall forming material into flatwise relation at the place of assembly, means for cutting cross wall sections from the last named strip, means for transporting the cut sections therefrom and assembling the same in transverse relation to the longitudinal wall forming strip, said transporting means being adapted thereafter to lift the assembled unit and transport the same laterally, an endless carrier located beneath the position to which the assembly is transported, said carrier having upstanding grippers adapted to engage the cross walls of the assembly, each of said grippers having releasing mechanism adapted to be actuated by the advance of the carrier, means for actuating said releasing mechanism, and a stripper in adjacent relation to the carrier for stripping the assembly therefrom as the carrier advances.

12. In a machine of the class described, the combination of means for advancing a strip of longitudinal wall forming material and bringing the same into edgewise relation at the place of assembly, means for bringing a strip of cross wall forming material into flatwise relation at the place of assembly, means for cutting cross wall sections from the last named strip, means for transporting the cut sections therefrom and assembling the same in transverse relation to the longitudinal wall forming strip, said transporting means being adapted thereafter to lift the assembled unit and transport the same laterally, an endless carrier located beneath the position to which the assembly is transported, said carrier having grippers upstanding therefrom in positions registering with the positions occupied by the cross walls of the assembly, each of said grippers comprising a pair of rotatable gripper members normally spaced to engage and grip said cross walls, a journal mounting for each pair of said rotatable gripper members configured to allow spreading thereof when the gripper members are rotated to releasing position, means actuated by the advance of the carrier for rotating said gripper members at the releasing point, and a stripper positioned to strip the assembly from the carrier after release by the grippers.

13. In a machine of the class described, the combination of a plurality of longitudinal guide members provided with longitudinal slots adapted to receive longitudinal wall forming strips and hold the same with their upper edges projecting above said slots, a mounting for said guide members adapted to permit tilting of the longitudinal plane thereof, a slidable cutter bar provided with slots configured to permit tilting of the longitudinal wall strips and thereafter to effect severance thereof by a sliding operation, means for transporting cross wall sections into edgewise relation with the upwardly presented edges of the longitudinal strips and for effecting engagement therewith, and means for tilting the guide members during the engaging operation to facilitate interlocking of the parts.

LEON BENOIT.
E. JOSEPH KANABAY.